United States Patent
Kasody et al.

(10) Patent No.: US 12,355,743 B2
(45) Date of Patent: Jul. 8, 2025

(54) MOBILE AUTHENTICATION AND CONTROL OF DIGITAL RECORDS CAPTURING REAL-WORLD MULTI-PARTY INTERACTIONS

(71) Applicant: Panasonic Avionics Corporation, Irvine, CA (US)

(72) Inventors: Robert Kasody, Costa Mesa, CA (US); FaizalSheriff Kalifullah Sheriff, Rancho Santa Margarita, CA (US); Saeed Pezeshkfar, Laguna Niguel, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 198 days.

(21) Appl. No.: 18/349,812

(22) Filed: Jul. 10, 2023

(65) Prior Publication Data

US 2024/0205208 A1 Jun. 20, 2024

Related U.S. Application Data

(60) Provisional application No. 63/387,831, filed on Dec. 16, 2022.

(51) Int. Cl.
*H04L 9/40* (2022.01)
*G06Q 50/40* (2024.01)

(52) U.S. Cl.
CPC ............ *H04L 63/08* (2013.01); *G06Q 50/40* (2024.01)

(58) Field of Classification Search
CPC ........ H04L 63/08; G06Q 50/40; G06Q 50/43; G06Q 50/47

(Continued)

(56) References Cited

U.S. PATENT DOCUMENTS

| | | | |
|---|---|---|---|
| 8,931,011 B1 * | 1/2015 | Hitchcock | H04N 21/43072 725/52 |
| 9,037,178 B1 | 5/2015 | Grochla et al. | |

(Continued)

FOREIGN PATENT DOCUMENTS

| | | |
|---|---|---|
| EP | 4386608 A2 | 6/2024 |
| EP | 4386654 A1 | 6/2024 |

(Continued)

OTHER PUBLICATIONS

Kupietzky, Joshua, "All Nippin Airways Will Launch an NFT Business," Jun. 4, 2023, retrieved from the internet https://simpleflying.com/all-nippon-airways-nft-business/ on Jul. 17, 2023.

(Continued)

*Primary Examiner* — Kaylee J Huang
(74) *Attorney, Agent, or Firm* — Perkins Coie LLP

(57) ABSTRACT

A central computing platform provides users with control over multi-party information involving third-party services during different stages of a travel journey, or while users are provided with data connectivity via different networks or systems. The central computing platform provides a digital ledger on which the multi-party information is recorded. Recording of the multi-party information, as well as modification thereof, requires authentication of each party as well as input (e.g., approval) by the computing platform. In some examples, the central computing platform provides users with control over digital records of real-world interactions with other users. The platform generates and publishes digital records of real-world interactions between users that include media data capturing the real-world interactions. In generating the digital records, the platform authenticates the users involved in the real-world interactions and can execute exchanges of the digital records with third-party users using authentication data for each of the interacting users.

22 Claims, 14 Drawing Sheets

(58) Field of Classification Search
USPC .......................................................... 726/6
See application file for complete search history.

(56) References Cited

U.S. PATENT DOCUMENTS

| | | | |
|---|---|---|---|
| 9,864,559 B2 | 1/2018 | Sizelove | |
| 10,084,810 B2 | 9/2018 | Watson et al. | |
| 10,136,293 B1 | 11/2018 | Rabii et al. | |
| 10,234,937 B2 | 3/2019 | Azmy | |
| 10,362,347 B1 | 7/2019 | Rabii et al. | |
| 10,861,119 B2 | 12/2020 | Keen et al. | |
| 10,909,582 B1* | 2/2021 | Brandt | G06Q 40/03 |
| 11,169,664 B2 | 11/2021 | Hoang | |
| 11,170,591 B2 | 11/2021 | Bates et al. | |
| 11,228,789 B2 | 1/2022 | Watson et al. | |
| 11,233,325 B2 | 1/2022 | Greenwood et al. | |
| 11,455,839 B2 | 9/2022 | Lad et al. | |
| 11,562,125 B1* | 1/2023 | Rathus | H04W 4/021 |
| 2003/0226142 A1* | 12/2003 | Rand | H04N 21/252 348/E7.063 |
| 2013/0265154 A1 | 10/2013 | Tumayan et al. | |
| 2015/0302421 A1* | 10/2015 | Caton | G06K 19/06037 705/17 |
| 2018/0041693 A1* | 2/2018 | Saraya | H04N 23/80 |
| 2018/0108104 A1 | 4/2018 | Keen et al. | |
| 2019/0379915 A1 | 12/2019 | Braun | |
| 2019/0379918 A1 | 12/2019 | Braun et al. | |
| 2020/0005284 A1* | 1/2020 | Vijayan | G06Q 20/065 |
| 2020/0134592 A1 | 4/2020 | Rao | |
| 2020/0233940 A1* | 7/2020 | Edwards | H04L 9/0637 |
| 2020/0366738 A1 | 11/2020 | Lauer | |
| 2020/0380508 A1 | 12/2020 | Sheriff | |
| 2021/0117955 A1 | 4/2021 | Stone et al. | |
| 2021/0352335 A1 | 11/2021 | Watson et al. | |
| 2022/0029813 A1 | 1/2022 | Wakabayashi | |
| 2022/0092599 A1* | 3/2022 | Sofaer | G06Q 20/0655 |
| 2022/0141215 A1 | 5/2022 | Kwok et al. | |
| 2022/0209847 A1 | 6/2022 | Eskridge, Jr. et al. | |
| 2022/0366172 A1* | 11/2022 | Stumpf | B60W 60/00 |
| 2023/0066272 A1* | 3/2023 | Patel | G06Q 20/326 |
| 2023/0069543 A1* | 3/2023 | Lupin | G06F 16/438 |
| 2024/0062325 A1* | 2/2024 | Kang | G06Q 20/145 |

FOREIGN PATENT DOCUMENTS

| | | |
|---|---|---|
| WO | 2020046913 A1 | 3/2020 |
| WO | 2021188103 A1 | 9/2021 |
| WO | 2024130186 A1 | 6/2024 |
| WO | 2024130191 A1 | 6/2024 |

OTHER PUBLICATIONS

Partial European Search Report from European Patent Application No. 223217351.8 dated Apr. 25, 2024 (12 pages).
Extended European Search Report from European Patent Application No. 23217352.6 dated May 2, 2024 (7 pages).
International Search Report and Written Opinion from PCT/US2023/084394 dated Apr. 12, 2024 (16 pages).
International Search Report and Written Opinion from PCT/US2023/084401 dated Apr. 12, 2024 (14 pages).
Non-Final Office Action issued in co-pending U.S. Appl. No. 18/349,768 on Apr. 10, 2025 (61 pages).

* cited by examiner

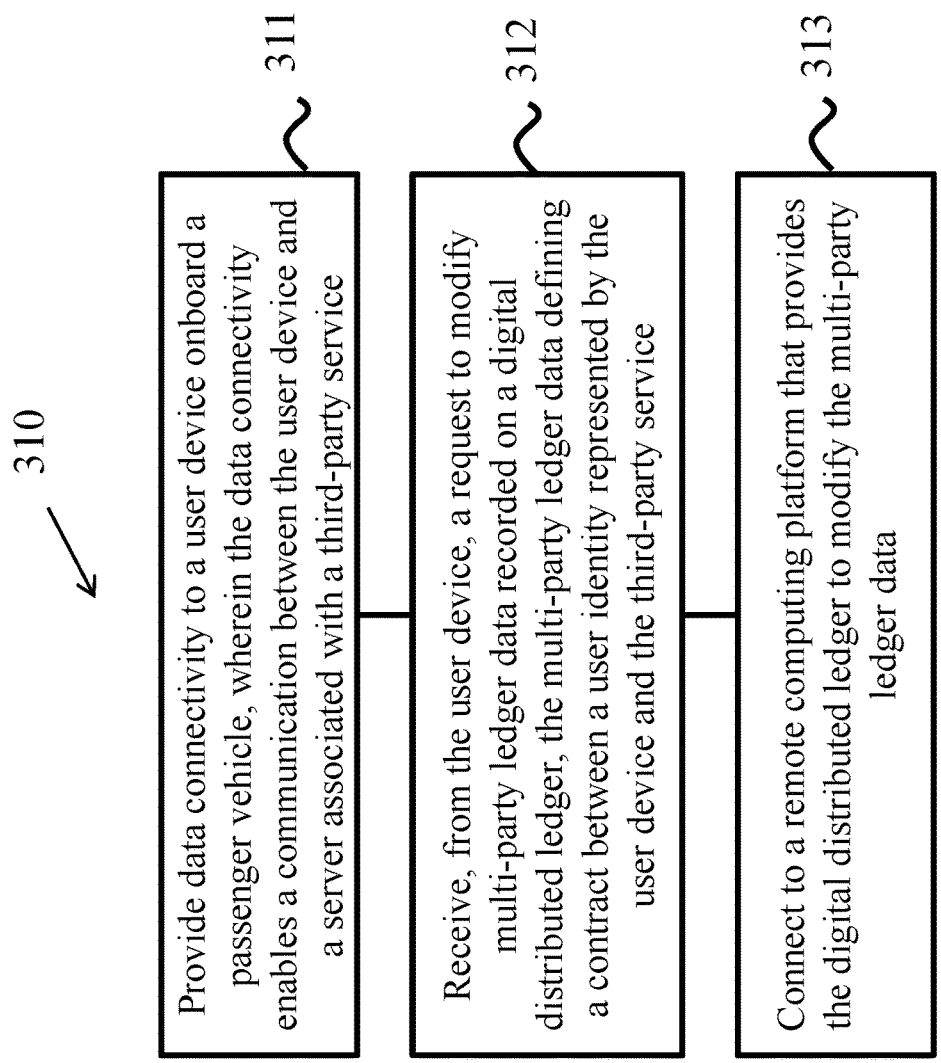

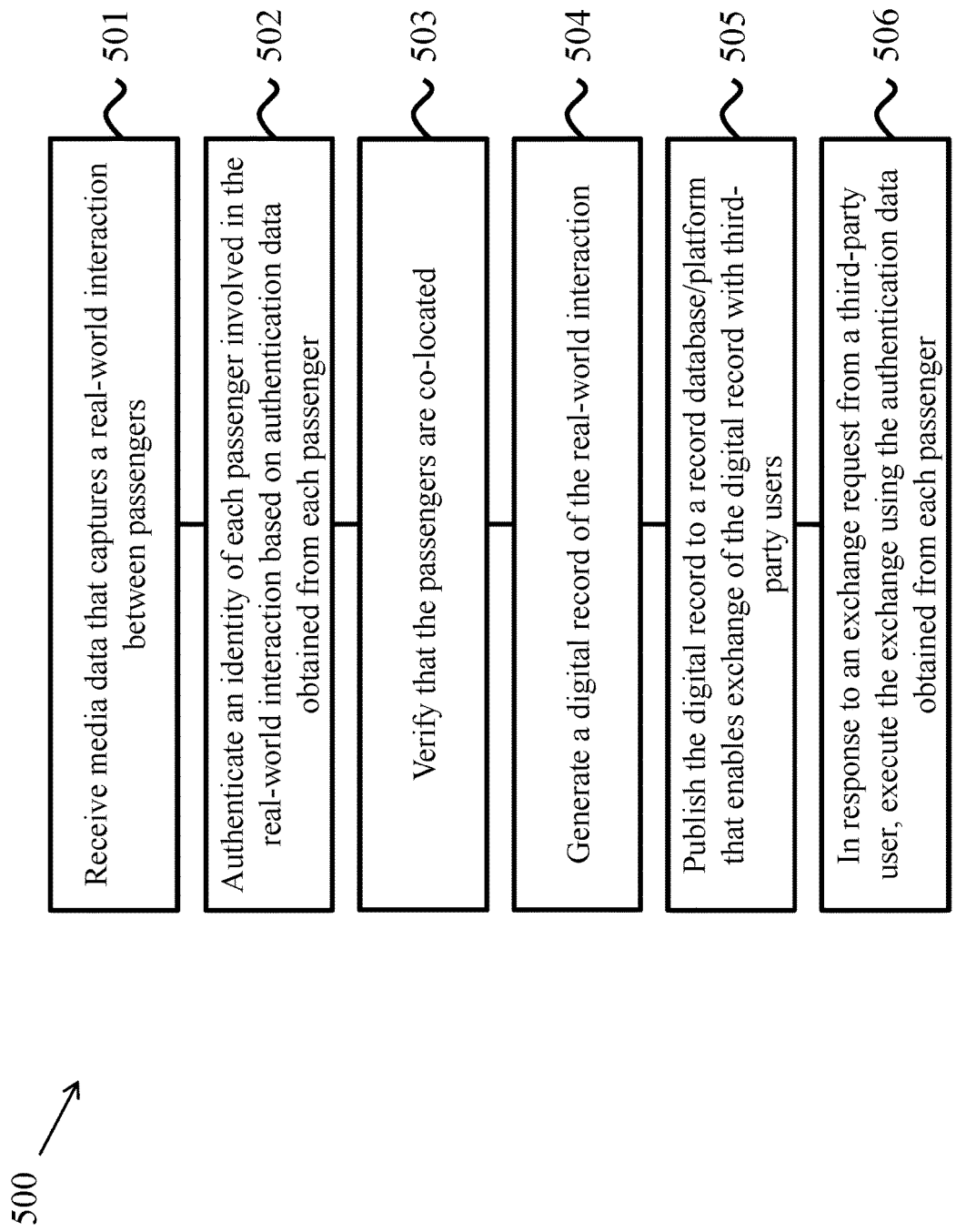

MOBILE AUTHENTICATION AND
CONTROL OF DIGITAL RECORDS
CAPTURING REAL-WORLD MULTI-PARTY
INTERACTIONS

CROSS-REFERENCE TO RELATED
APPLICATIONS

This application claims priority to, and the benefit of, U.S. Provisional Application No. 63/387,831, titled MOBILE PLATFORM FOR PRODUCT/SERVICE MODIFICATIONS and filed on Dec. 16, 2022. The aforementioned application is herein incorporated in its entirety, including any drawings and appendices.

TECHNICAL FIELD

The present disclosure relates to communications via in-vehicle or inflight systems between user devices and remote systems.

BACKGROUND

Commercial travel has evolved to provide entertainment options to passengers traveling to their destinations. For example, in an airplane or train, in-vehicle systems that include seatback monitors can provide entertainment options to passengers such that passengers can watch movies or television shows as they travel to their destinations. Passenger vehicles have also begun to provide connectivity tools that may provide additional opportunities to passengers for entertainment or productivity.

SUMMARY

The present disclosure relates to providing ubiquitous access to and control over multi-party digital data pertaining to passengers and third-party services during different travel journey stages across which the passengers are provided with different data connectivities. Example embodiments enable a user to modify the multi-party digital data stored on a digital ledger while the user is connected to their digital persona or identity via a terrestrial network, such as a cellular network, as well as while the user is connected to their digital persona or identity via a mobile platform, such as an in-flight connectivity system of an aircraft in which the user device is located. Thus, embodiments described herein promote user/passenger mobility based on permitting user control over their digital personas/identities and multi-party digital data irrespective of the network/platform providing the data connectivity.

In particular, the present document describes example embodiments of a computing platform (e.g., a ground server, a cloud computing system, a distributed computing system) that is communicatively coupled with terrestrial or local networks as well as in-vehicle mobile platforms. According to example embodiments, the computing platform maintains a digital ledger for multi-party digital data (e.g., data specifying products/services exchanged between a user and a third-party service, data relating to agreements/contracts/transactions between users and third-party services). The multi-party digital data is validated and recorded on the digital ledger by the computing platform based on authentication of each party. In this configuration, the digital ledger may be understood as a triple-entry digital ledger; access to ledger data requires three entries or keys from the computing platform (or its operating entity), the user, and the third-party service. With the computing platform being coupled with various networks and in-vehicle mobile platforms, a user can, in one example, access and/or request to modify, via data connectivity provided by an in-flight connectivity system, a ledger entry that was previously recorded when connected to the Internet via a cellular network. In some examples, the computing platform is configured to authenticate the parties associated with ledger entries and validate multi-party digital data based on acting as (or in association with) an issuing authority for digital certificates assigned to third-party services and/or users.

Further example embodiments included herein relate to digital records of real-world interactions between passengers, and to the creation, management, and exchange of these digital records. Example embodiments enable creation of a digital record of a real-world interaction based on data relating to the real-world interaction, in particular, including media data that captures the real-world interaction and authentication data related to the identity of the passengers/users involved in the real-world interaction. In particular, a digital record is created upon verifying the identity of the involved passengers/users and verifying that the involved passengers/users were co-located such that the real-world interaction likely occurred. The authentication data can be further used to attribute the digital record to the digital personas (e.g., digital wallets, profiles, accounts) of the involved passengers/users and to execute exchanges (e.g., transactions) of the digital record with other users and/or modifications to the digital record. According to some examples, the digital record is an NFT that captures the real-world interaction and that is minted on a blockchain for exchange of the digital records to the other users. In connection with other embodiments disclosed herein, the digital records can be modified, controlled, exchanged, and/or the like by passengers during different travel journey stages via different data connectivities.

In one example aspect, a computing platform is disclosed. The computing platform includes at least one processor and at least one memory. The at least one memory stores instructions that, when executed by the at least one processor, cause the computing platform to provide a digital ledger configured to store ledger entries for users and third-party services based on validations determined by the computing platform, or based on the computing platform authenticating the users and third-party services. The instructions further cause the computing platform to, while a user has a first data connectivity provided by a network, generate a ledger entry on the digital ledger to define a contract that specifies a digital identity of the user and a third-party service. The instructions further cause the computing platform to, subsequent to the user switching to a second data connectivity provided by an in-vehicle system of a commercial passenger vehicle: detect, from the in-vehicle system, a request by the user to modify the ledger entry on the digital ledger. The instructions further cause the computing platform to validate authentication data obtained from the in-vehicle system relating to the request, the authentication data associated with the digital identity of the user and an identity of the third-party service. The instructions further cause the computing platform to modify the ledger entry on the digital ledger according to the request, based on the authentication data being validated.

In another example aspect, an in-vehicle system, such as an in-flight connectivity system, is disclosed. The in-vehicle system can be for a commercial passenger vehicle. The in-vehicle system includes a processor and a memory storing instructions that, when executed by the processor, cause the in-vehicle system to provide data connectivity to a user device located onboard a commercial passenger vehicle on which the in-vehicle system is implemented. The data connectivity enables a communication between the user device and a server associated with a third-party service. The instructions cause the in-vehicle system to receive, from the user device, a request to modify multi-party ledger data recorded on a digital distributed ledger, the multi-party ledger data defining a contract between a passenger operating the user device and the third-party service. The instructions cause the in-vehicle system to connect to a remote computing platform that provides the digital distributed ledger to validate the request to modify the multi-party ledger data. The remote computing platform is located external to the commercial passenger vehicle. For example, the remote computing platform is a ground server, a cloud computing platform, a distributed computing system, and/or the like.

In yet another example aspect, a method is disclosed. The method includes providing a digital ledger configured to store ledger entries for users and third-party services based on validations determined by the computing platform. The method further includes generating a ledger entry on the digital ledger to define a contract between a digital identity of a user and a third-party service. The method further includes, while an in-vehicle system of a commercial passenger vehicle provides a limited data connectivity to the user, detecting, a request by the user to modify the ledger entry on the digital ledger. The method further includes obtaining, from the in-vehicle system, authentication data relating to the request by the user. The method further includes based on validating at least the digital identity of the user via the authentication data, modifying the ledger entry on the digital ledger according to the request.

In one example aspect of the present disclosure, a computer readable medium is disclosed. The computer readable medium stores processor-executable program code that, upon execution by one or more processors, causes implementation of a method described in the present document.

These, and other aspects are disclosed throughout the present document.

BRIEF DESCRIPTION OF THE DRAWINGS

FIG. 3B is a flow diagram illustrating example operations for providing a passenger with control over digital data while a passenger is mobile.

FIG. 5A is a flow diagram illustrating example operations for controlling digital records of multi-party interactions while a passenger is mobile.

DETAILED DESCRIPTION

Figure 1A:
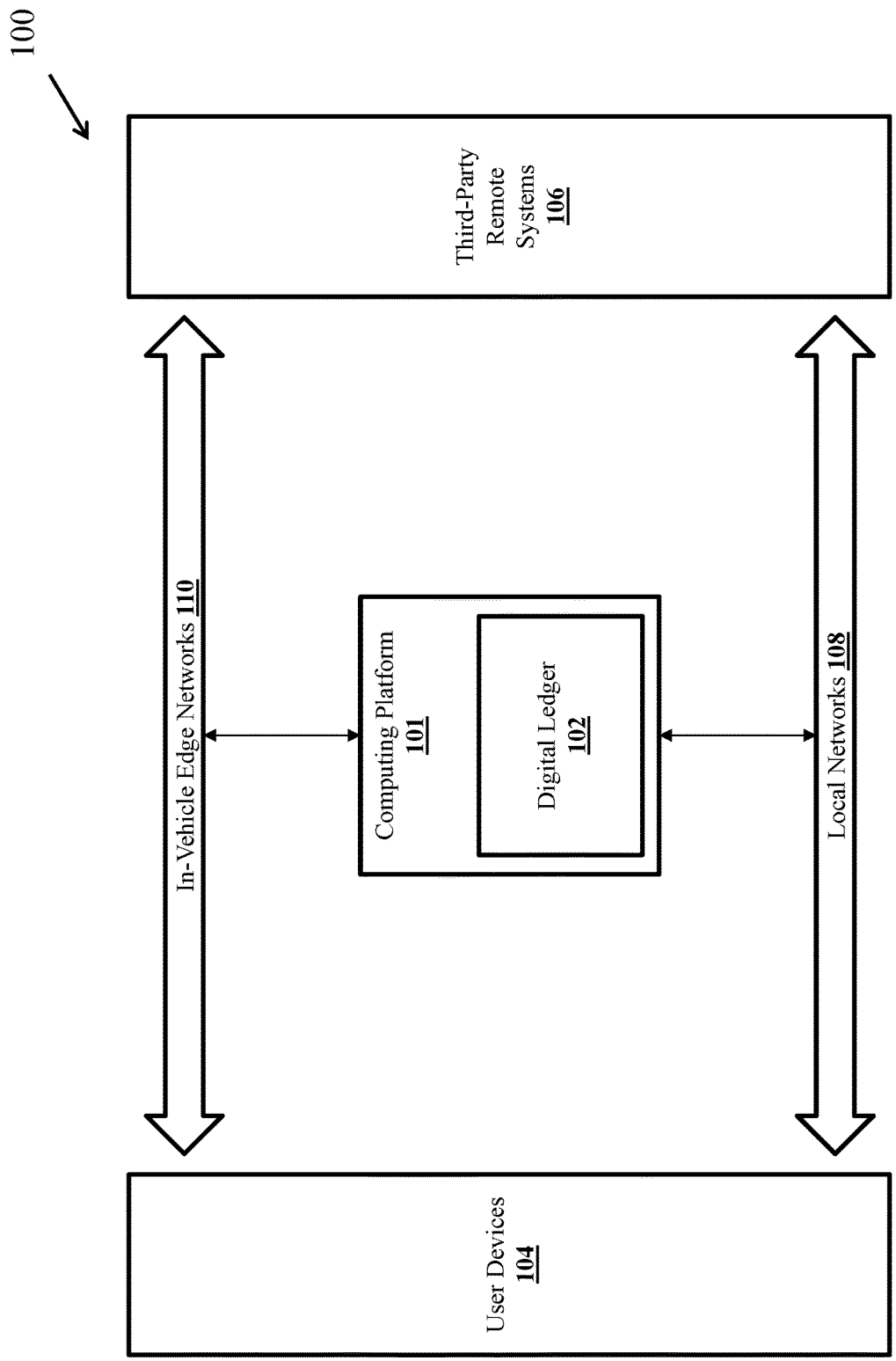
FIG. 1A is a block diagram of an example system in which embodiments described herein can be implemented.

Modification of Multi-Party Ledger Data with Mobile Platforms

Conventionally, passengers on a mobile platform (e.g., driver/driverless vehicles, commercial airplanes, electric vertical take-off and landing (eVTOL) aircraft, rideshare vehicles) can purchase, upgrade, or modify third-party products and services through instructions, electronically through email, manually inputting through an inflight entertainment system database, and/or orally/written as a form of service change instructions processed on an entry sheet to a database manager for an airlines database provider. These modes of third-party interactions for a passenger can differ depending on the passenger, the airline or entity operating the mobile platform, international protocols for country of travel (e.g., origin, intermediate destination, final destination), or the like, and third-party service modification instructions could be country-specific, airline-specific, or otherwise based on various protocols. There needs to be a way that passengers and third-party services can change/modify/upgrade their digital product/services level of service that follows them from mobile platform to mobile platform during different stages of travel (e.g., pre-travel, in-travel, post-travel).

Furthermore, connectivity services provided by mobile platforms can be limited, with certain whitelisted IP domains being provided to connected passenger devices. Accordingly, authentication between multiple parties when at least one party is provided with such a limited data connectivity is a challenge when defining/modifying/updating multi-party information. For example, a passenger device connected to limited connectivity services that are provided by a mobile platform (e.g., a commercial aircraft) may not be able to communicate with authentication provides that typically authenticate web certificates exchanged between parties. As a result, at certain points in a passenger's travel journey, end-to-end authentication or validation in passenger communications is a technical challenge. Thus, a need also exists to provide validation or authentication for passengers and third-party services when multi-party information (e.g., agreements/contracts/transactions related to third-party products or services) is changed or updated.

Described embodiments provide technical solutions related to authenticated control by a user over multi-party information involving the user's digital identity (e.g., user accounts, user personas, user avatars) during different stages of a travel journey, when the user can be connected to the user's digital identity via different types of networks and systems. According to example embodiments, a computing platform (e.g., implemented by a ground server, a cloud computing system, a distributed computing system or cluster) is integrated or communicatively coupled with the various networks and systems that a user may connected with during a travel journey, and the computing platform represents a consistent or persistent authentication party to the multi-party information that involves the user (or the user's digital identity). The computing platform records the multi-party information on a digital ledger based on authenticating the other involved parties, and the computing platform, via its coupling with various data connectivity mediums, allows the user with opportunities throughout the user's travel journey to modify the multi-party information irrespective of the data connectivity medium presently used by the user. Thus, while a user moves between a home Wi-Fi network to a cellular network to an in-flight connectivity network, the user retains authenticated control over its multi-party information and communications with other parties.

The following describes one illustrative non-limiting example in which a passenger is provided with access and control over multi-party information across each stage of the passenger's travel journey. In a pre-flight stage, a passenger initiates a contract with a hotel (e.g., specifying a check-in time, specifying a room service meal) that is located at a travel destination. The passenger initiates the contract via an Internet connection provided by a local area network (LAN) (e.g., a Wi-Fi network) at home or by a cellular network, and a computing platform records the contract as a ledger entry in a digital ledger. The passenger is represented in the contract by the passenger's digital identity, such as a digital or online account owned and operated by the passenger. In an in-flight stage, the passenger requests a modification to the contract with the hotel (e.g., due to a flight delay) while connected to an in-vehicle connectivity system of the aircraft in which the passenger is located. Here, some techniques suffer due at least to an inability to authenticate the passenger's use of the passenger's digital identity to the hotel (and likewise authenticate an identity of the hotel to the passenger). According to the embodiments described herein, the in-vehicle connectivity system communicates with the computing platform to authenticate each of the parties and allow modification to the ledger entry. In a post-flight stage, the hotel provides products/services to the passenger according to the modified contract recorded by the updated ledger entry on the digital ledger, accessible by a system associated with the hotel. The passenger's mobility is thus improved.

Therefore, the embodiments described herein can implement technical benefits in at least travel applications. When passengers have travel arrangements, the described embodiments enable passengers to upgrade, downgrade, or enter new contracts or transactions with other passengers, third-party services, mobile platform operators (e.g., an airline, a ridesharing company), and others. Modifications to multi-party contracts/transactions, as well as agreements for new multi-party contracts/transactions, can be time stamped and dated with location, and the parties or participants of the multi-party contracts/transactions can receive or be rewarded (e.g., compensated) according to the latest agreed-upon parameters.

FIG. 1A illustrates an example system 100 in which passengers are provided with control over multi-party information across different journey stages. The example system 100 includes a central computing platform 101 that provides a digital ledger 102 on which multi-party information, such as agreements, contracts, and transactions between multiple parties that specify products/services, can be recorded. In particular, the central computing platform 101 records multi-party information related to passengers or users associated with user devices 104 of the example system 100, as well as third-party services associated with third-party remote systems 106 or systems in the example system 100. In particular, the passengers or users access their digital identities that are party to the multi-party information via the user devices 104. These user devices 104 can include electronic devices at which data connectivity is provided to the passengers/users. Examples of user devices 104 accordingly include mobile devices, smartphones, tablets, laptops, desktop computers, servers, Internet-of-Things (IoT) devices, and the like. Further, user devices 104 can include individual devices within an in-flight entertainment and connectivity (IFEC) system within a vehicle (e.g., a commercial passenger aircraft, an eVTOL aircraft, a passenger train, a ride-sharing vehicle), such as a seatback monitor on a commercial passenger aircraft on which a user can access (e.g., log-in via a client application) a digital identity or persona of the user. The multi-party information is defined based on communications between and/or originating from the user devices 104 and/or the third-party remote systems 106.

The central computing platform 101 records multi-party information (e.g., contract data, transaction parameters) on the digital ledger 102 based on being communicatively coupled to the networks via which the user devices 104 and the third-party remote systems 106 communicate to arbitrate, define, or respectively agreed upon or accept the multi-party information. These networks can include local networks 108 with which the user devices 104 are connected, as well as in-vehicle edge networks 110 or in-vehicle connectivity systems that provide data connectivity to user devices 104 located in a vehicle. Examples of local networks 108 include local area networks (LAN) (e.g., a Wi-Fi network), terrestrial networks, cellular networks (e.g., a 3G network, a 4G network, a 5G network, a 6G network), and the like. Examples of in-vehicle edge networks 110 include in-flight satellite systems for aircraft, cellular network slices used by autonomous vehicles, edge portions of a local network 108, and the like. In some embodiments, the central computing platform 101 is communicatively coupled to the local networks 108 and/or the in-vehicle edge networks 110 such that the central computing platform 101 can receive, detect, or observe communications by the user devices 104 related to defining and/or modifying multi-party information. For example, the in-vehicle edge networks 110 are in-vehicle connectivity systems in multiple aircraft that are communicatively coupled (e.g., via satellites) to a network with the central computing platform 101. For example, the local networks 108 are implemented as content delivery networks (CDNs) for the central computing platform 101.

The central computing platform 101 further records data on the digital ledger 102 based on authenticating each of the parties involved in a multi-party information for a ledger entry in the digital ledger 102. For example, given a multi-party transaction between a particular user and a particular third-party service, the central computing platform 101 authenticates each of the particular user (or the digital identity used by the user) and the particular third-party service prior to recording the multi-party transaction as an entry in the digital ledger 102. In this way, the digital ledger 102 can be implemented as a triple-entry ledger (the central computing platform 101 itself can also be authenticated or validated). For example, to record, modify, or delete a ledger entry for a contract between the particular user and the particular third-party service, three separate inputs or keys are needed: one input for the particular user, another for the particular third-party service, and another for the central computing platform 101.

In some examples, the user's authentication/validation input can be authentication data generated locally by the user's user device, such as a digital certificate generated based on the user securely identifying itself on the user device (e.g., biometric identification via a fingerprint, biometric identification via facial recognition, identification via a password, identification via a personal identification number). Based on this authentication data, the central computing platform 101 can verify the user's authorization to use, control, and modify the digital identity or persona of the user. The third-party service's authentication/validation input can similarly be authentication data generated locally based on a corresponding third-party remote system based on the third-party service (e.g., another person or individual, a representative of a service entity or service organization) securely identifying itself thereat.

In some examples, one or more of the user's authentication/validation input or the third-party service's authentication/validation input for interacting with the digital ledger 102 can be authentication data issued by the central computing platform 101. For example, the central computing platform 101 acts as or is associated with an issuing authority, a certificate authority, a certification authority, or the like that stores, signs, generates, and/or issues digital certificates to user devices 104 of users and/or to third-party remote systems 106 of third-party services. Communications from user devices 104 and/or third-party remote systems 106 can include digital certificates respectively issued by the central computing platform 101, and such communications that relate to multi-party information and ledger entries of the digital ledger 102 can be accordingly processed based on the digital certificates. In some embodiments, a user device 104 stores digital certificates (e.g., public certificates) of a pre-identified set of third-party services. For example, a personal device operated by a user stores client user applications associated with (offered by) third-party services, and the client user applications are configured with the public certificate of the corresponding third-party services. In another example, a seatback monitor on a commercial passenger vehicle similarly stores digital certificates for certain third-party services, which can be used while a user communicates with the certain third-party services.

In some examples, the central computing platform 101 communicates with an issuing/certificate authority or a global issuing body that is separate from or different than the entity that operates the central computing platform 101 to offer the disclosed capabilities of mobile modifications to digital personas and multi-party transaction data. In such examples, the central computing platform 101 can present a digital certificate associated with its operating entity to the issuing/certificate authority so that the operating entity can be validated. With its identity validation, the central computing platform 101 can sign digital tokens and provide the tokens or public keys as a reference for participants in the offered mobile modification capabilities (e.g., passengers of mobile platforms, third-party service providers). Due to the central computing platform 101 having a live connection with the participants, the three-way validation for signing modifications to digital personas and multi-party transaction data can exist.

The number of inputs or keys for a ledger entry can correspond to a number of parties involved in the multi-party information (in addition to the central computing platform 101 itself). For example, if the multi-party information relates to an agreement between a particular user and a plurality of certain third-party services (e.g., a travel package including a hotel reservation and a restaurant reservation), the central computing platform 101 can configure a particular transaction entry recording the agreement to require authentication of each of the particular user and the plurality of certain third-party services prior to modification to the agreement. In some embodiments, authentication of each relevant party is required for modification to a ledger entry recorded on the digital ledger 102. A relevant party requesting to access a ledger entry can be required to provide authentication as well. For example, a third-party remote system 106 provides authentication to the central computing platform 101 in order to review and reference the latest contract parameters recorded on a ledger entry of the digital ledger 102 so that a corresponding third-party service can provide products or services to a user according to the latest contract parameters.

Due to the role of the central computing platform 101 in maintaining and providing the digital ledger 102, as well as representing one of the required authentication/validation inputs, user connectivity with multi-party information or data on the digital ledger 102 persists as a user moves and connects to different networks (e.g., via different user devices 104). For example, the central computing platform 101 itself becomes a participant to a multi-party contract because of its own authentication of the other parties, irrespective of whether a user is connected to a network that enables existing authentication techniques (e.g., a local network 108) with the other parties or whether a user is connected to a system that is limited in authenticating endpoints (e.g., an in-vehicle edge network 110).

In some embodiments, an in-vehicle edge network 110 are equipped to authenticate or validate the parties of multi-party information defined via the in-vehicle edge network 110. For example, an in-vehicle edge network 110, such as an in-flight connectivity system or an in-flight entertainment system, is operated by the same issuing authority or certificate authority as the central computing platform 101. Therefore, in some embodiments, the in-vehicle edge network 110 is able to perform the authentication of the passenger and other parties to the multi-party information. In particular, the in-vehicle edge network 110 can validate the authentication data pertaining to the passenger (e.g., a digital certificate generated based on biometric identification) and/or the authentication data pertaining to a third-party service according to previously-issued authentication data issued by the issuing authority, certificate authority, or the central computing platform 101. Further, in some embodiments, the in-vehicle edge network 110 can apply requested modifications to local or cached copies of ledger entries (based on the validations) and later synchronize the modifications to digital ledger 102 provided by the central computing platform 101, for example, whenever the in-vehicle edge network 110 has a reliable connection with the central computing platform 101.

Figure 1B:
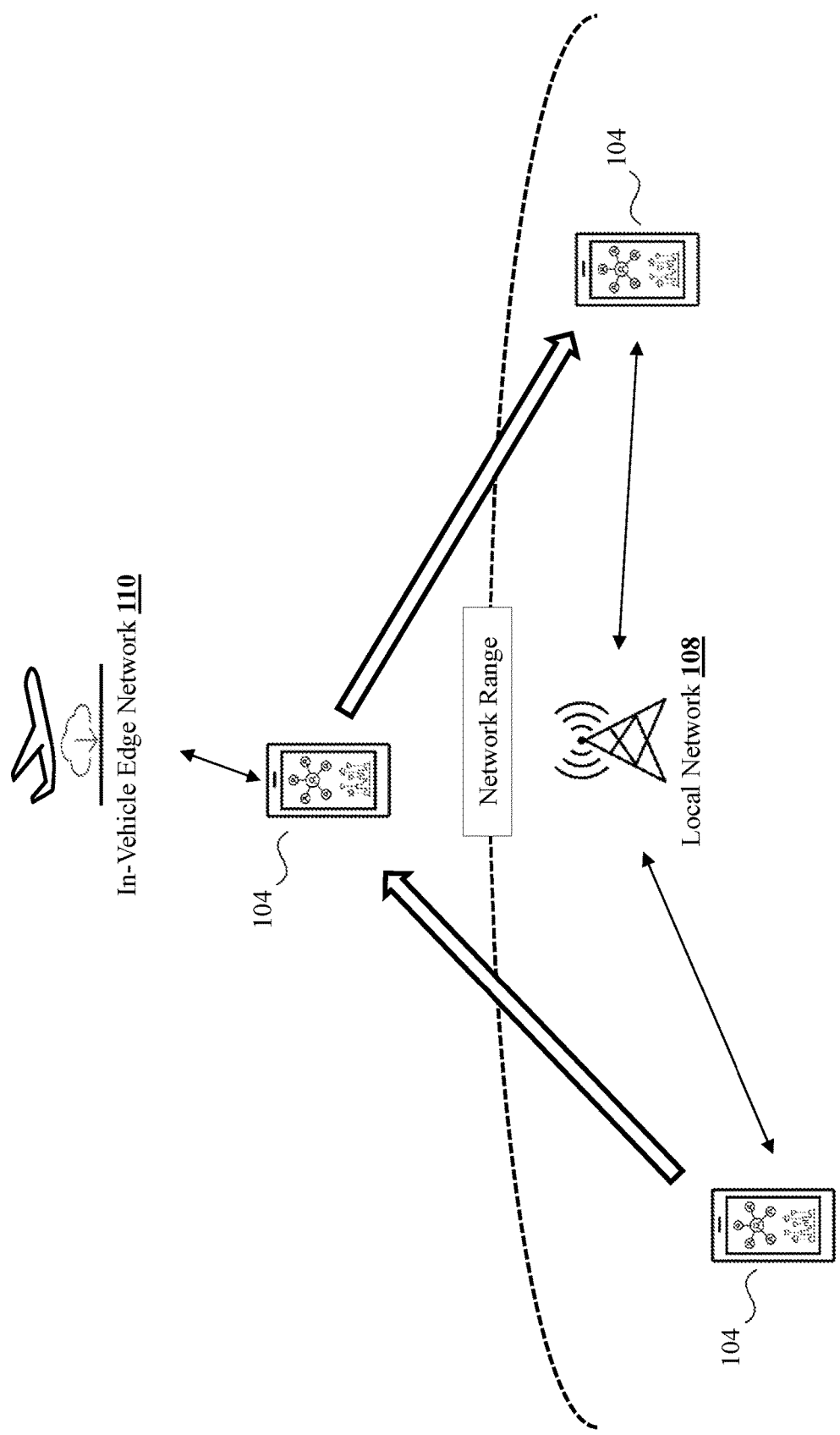
FIG. 1B is a diagram illustrating different data connectivities provided to a user by different networks.
Figure 1C:
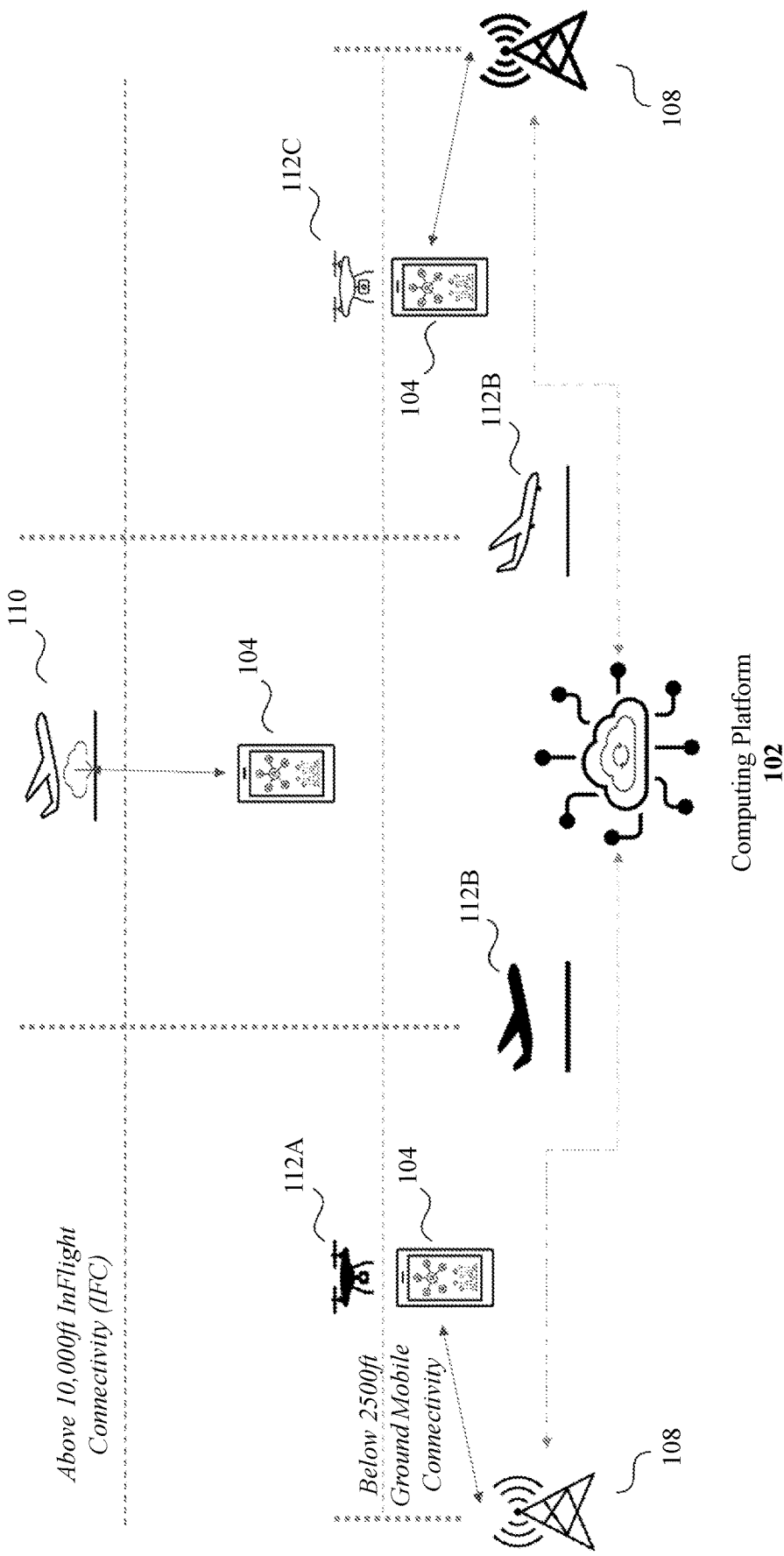
FIG. 1C is a diagram illustrating different data connectivities provided to a user by different networks across stages of a travel journey.

FIGS. 1B-1C each illustrate a user device 104 being provided by different data connectivities by different networks or platforms, including a local network 108 and an in-vehicle edge network 110 or a mobile connectivity system (e.g., an in-flight connectivity system). The different data connectivities provided to the user device 104 by different networks or platforms represent different stages in a travel journey of a user associated with the user device 104. The illustrated examples are described with respect to a user device 104 travelling and connected to different networks.

However, it will be understood that the user device 104 represents the user/passenger as the user/passenger travels to different locations and within different vehicles. Further, the different vehicles can be operated by different mobility entities (e.g., Uber™, Lyft™, United™, Delta™, and/or the like), and a user/passenger can transfer between more than one vehicle operated by different mobility entities before the travel journey ends. In particular, at different points in the illustrated example scenarios, the user may use different user devices 104, such as a smartphone at a first point in the travel journey and a seatback monitor at a second point in the travel journey.

Prior to embarking or boarding on a mobile platform for the travel journey (e.g., a "pre-travel" stage), the user device 104 can be connected to one or more local networks 108, such as a home Wi-Fi network or a cellular network to which the user subscribes. Via the local networks 108, the user device 104 can communicate with third-party remote systems associated with third-party services. For example, the user device 104 can access hosted applications provided by third-party remote systems in order to define, request, and/or accept multi-party contracts or transactions with the third-party services. In some embodiments, the user device 104 stores a user application associated with a third-party service (e.g., a Marriot™ app, an Uber Eats™ app) that is configured with authentication data (e.g., a digital certification) issued by the central computing platform 101, and this authentication data is used as one input by the central computing platform 101 to modify ledger data in the digital ledger 102.

Whenever the user device 104 is located on a mobile platform and the mobile platform remains within a network range of a local network 108, the user device 104 can remain connected to the local network 108. For example, the local network 108 can continue providing data connectivity to the user device 104 to an extent while the user device 104 is located and being transported by a mobile platform. In particular, FIG. 1C illustrates an example of a user device 104 being located on a first mobile platform 112A (e.g., an eVTOL aircraft, a VTOL aircraft, a helicopter or rotorcraft) but remaining in network range (e.g., an altitude below 2500 feet) of a local network 108 (e.g., a cellular network).

The user device 104 can then be transported outside of a network range of the local network 108, for example, via the first mobile platform 112A or a second mobile platform 112B (e.g., a commercial passenger aircraft). At this point during an "in-travel" stage, the user device 104 can connect to an in-vehicle edge network 110 for data connectivity, due to being unable to obtain data connectivity from the local network 108. For example, FIG. 1C illustrates an example in which the second mobile platform 112B transports the user device 104 above 10,000 feet, where the user device 104 relies upon in-flight connectivity systems to provide data connectivity.

Subsequently, at a "post-travel" stage, the user device 104 can be transported within a network range of a local network 108 (e.g., the same local network as the pre-travel stage, a different local network). The user device 104 can connect to the local network 108 and switch to the data connectivity provided by the local network 108 in lieu of the data connectivity provided by the in-vehicle edge network 110. In the post-travel stage, the user device 104 can continue moving between mobile platforms, such as from the second mobile platform 112B to a third mobile platform 112C (e.g., another eVTOL aircraft, a ridesharing vehicle) while within network range of the local network 108 and remaining connected thereto.

Various modifications or alternatives to the described and illustrated travel journeys can be experienced by a user device 104. Further, as described, the user device 104 can move between any number of mobile platforms in any one or more of the stages of the travel journey.

As described herein, the user can maintain connection with the digital ledger and its multi-party information or data across these stages of the travel journeys that involve different data connectivities and networks, due to the role of the central computing platform 101 The user device 104 can securely communicate with the third-party remote systems based on authentication techniques implemented by the local networks 108 (e.g., Hypertext Transfer Protocol Secure (HTTPS), authentication techniques associated with Transport Layer Security (TLS), authentication techniques/handshakes associated with Secure Sockets Layer (SSL)). Nonetheless, the central computing platform 101 (described above with FIG. 1A and described elsewhere herein) is communicatively coupled with the local networks 108 in order to contribute an authentication input for its digital ledger 102 for entries related to the user device's user and the third-party services with which the user interfaces. In some embodiments, the local networks 108 are connected to and can synchronize with the central computing platform 101 and its digital ledger 102. For example, the local networks 108 include or are connected to a content delivery network (CDN) associated with, coupled with, or implementing the central computing platform 101. For example, the local networks 108 are implemented as edge nodes or edge portions of the central computing platform 101 (or of a cloud network that includes and implements the central computing platform 101). Due to live connectivity between the edge nodes/portions (e.g., mobile platform systems, local networks 108) with the central computing platform 101, an updated copy of the digital ledger 102 can be available at the edge nodes/portions.

In some embodiments, the mobile platforms 112 (e.g., an in-flight connectivity system on an aircraft) can provide authentication tokens to the user devices located therein, such that the user devices can use the authentication tokens when requesting new or modified multi-party information. In some embodiments, the mobile platforms 112 connect to the central computing platform 101 to issue authentication tokens or digital certificates to passengers, such that the passengers can use the authentication tokens or digital certificates to modify multi-party information. The mobile platforms 112 can be associated with the same issuing authority or certificate authority with which the central computing platform 101 is associated.

Therefore, in the pre-travel stage, the user device 104 can define multi-party information for recording on the digital ledger 102. The user device 104 can modify the multi-party information that is recorded on the digital ledger 102 while in the in-travel stage on a mobile platform 112. The user device 104 can again modify the multi-party information when in the post-travel stage. The user device 104 can also define new multi-party information to be recorded on the digital ledger 102 while in the in-travel stage on the mobile platform 112. For example, the user device 104 receives an indication of a new contract (e.g., a new promotion or offer for products/services by a third-party service) while on the mobile platform 112, and the user device 104 may receive the indication of the new contract based on the mobile platform 112 authenticating the digital identity represented by the user device 104 to the third-party service (therefore, the third-party service is assured that the new contract is being delivered to the correct identity or person). The user device 104 can accept the new contract while using the data connectivity provided in the mobile platform 112, thus resulting in the new contract being recorded on the digital ledger 102. That is, the mobile modification opportunities for digital identities and multi-party information enabled by the example embodiments described herein include the acceptance and creation of new parameters and multi-party agreements/contracts while on mobile platforms. Therefore, connectivity to multi-party information and control over the multi-party information is provided to users, thus promoting and improving user mobility.

Figure 1D:
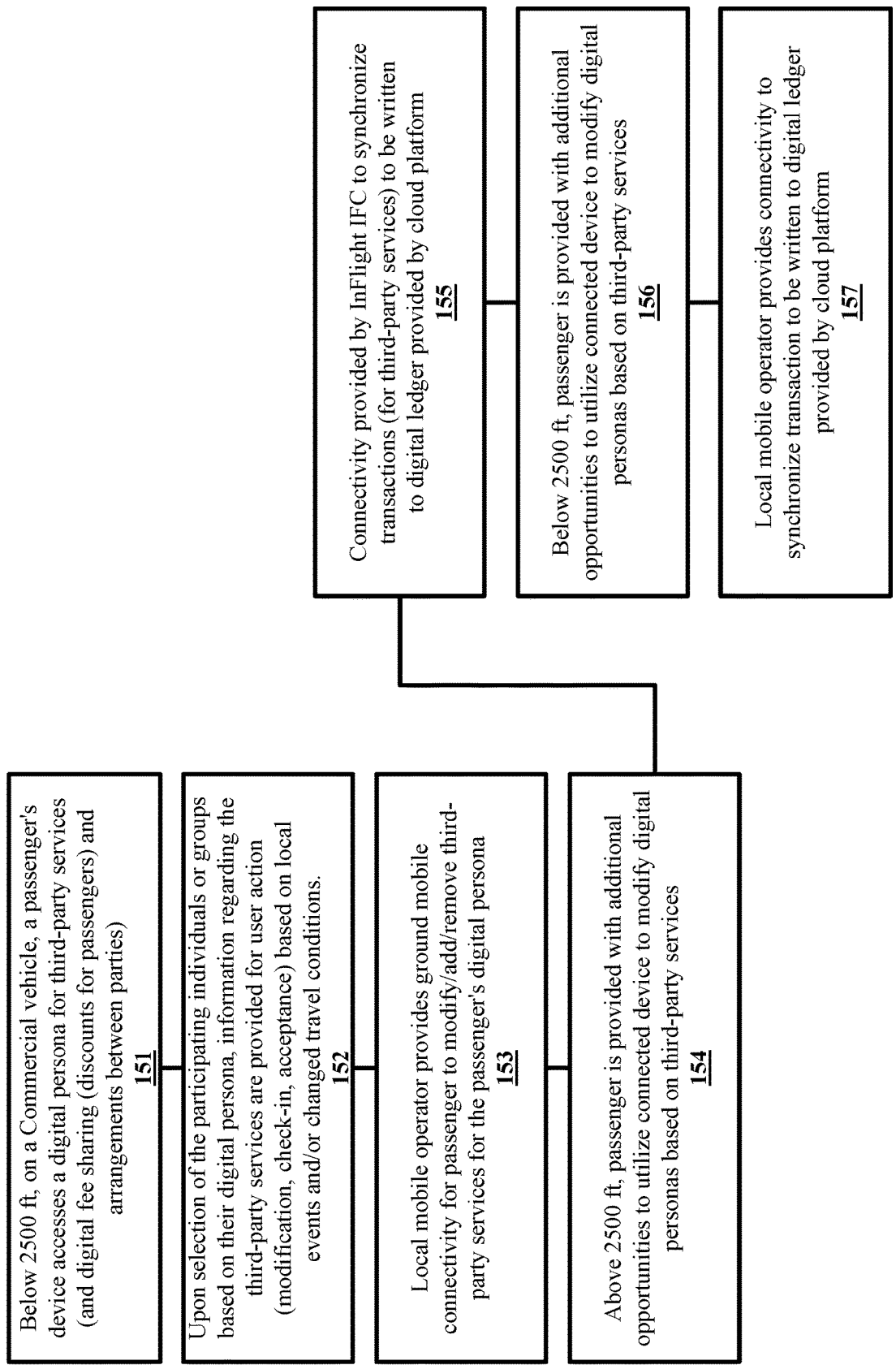
FIG. 1D is a flow diagram illustrating example operations for providing cross-travel access and control to passengers over multi-party digital ledger data.

FIG. 1D illustrates example operations performed in the system 100 across different stages of a user's travel journey, for example, a travel journey corresponding to that illustrated in FIG. 1C. At block 151, the passenger is located below 2500 ft. On a Commercial vehicle (e.g., an eVTOL aircraft, a ridesharing vehicle), a passenger's cellular smart device accesses a digital persona of themselves or individuals or groups and a list of participating individuals or groups of digital personas for products and services (e.g., digital fee sharing, discounts for passengers, and arrangements between parties). For example, the passenger is associated with a plurality of user accounts each corresponding to a third-party service (e.g., a hotel chain, a food delivery service). User accounts for certain third-party services that are supported by the example system 100 can be indicated to and accessed by the passenger. For example, the certain third-party services that are supported by the example system 100 include those entities, organizations, individuals, and/or the like that participate in the digital ledger, have agreed to record multi-party information on the digital ledger, have been issued with digital certificates or authentication data by the cloud platform, and/or the like. For example, the certain third-party services are "participating" third-party services.

In some examples, the third-party services are related to travel and tourism services of various types. One example type or group of third-party services that can be supported in the example system 100 includes those providing Tourism-Oriented Products (TOP), or products and services created primarily for tourists of a region as well as locals. Such third-party services include accommodation services (e.g., Taj. ITC Hotels, Marriot International), transportation services (e.g., a taxi service, luxury bus service, boat service), retail travel agents, tour operators, shopping centers or malls, cinema theaters (e.g., PVR Cinemas), restaurants, tourism information centers, souvenir outlets, museums, temples, gardens, theme parks, and/or the like. A passenger retains control over agreements, contracts, transactions with these third-party services during the passenger's travel journey according to the embodiments described herein.

Another example type or group of third-party services includes those providing Resident-Oriented Products (ROP), or products and services provided mainly for local residents at a particular tourist destination. Such third-party services include hospitals, public parks, banks and automated teller machines (ATMs), gas station or pumps, postal services, and/or the like. A passenger retains control over agreements, contracts, transactions with these third-party services during the passenger's travel journey according to the embodiments described herein.

Some third-party services relate to intangible products, including bookings of accommodations, tourists' experience (by visiting a destination, eating at a restaurant, or performing an activity), tourists' memory (which is created by storing the details of events and experience on the tour), transportation of tourists and their luggage from one place to another. As mentioned above, third-party services include products and services provided by tour operators and the skilled/qualified staff thereof. Tour operators can provide the following typical products and services: accommodations, reservations, guided tours, transport facilities, and dining facilities.

Accommodations include serviced accommodations (supported by skilled staff such as housekeepers, drivers, guides, and cooks), self-catering (staying facilities but dining is required to be self-catered, facilities can be equipped with cooking, fuel and facility, some basic supplies such as tea/coffee/sugar sachets, and a drinking water source), hotels (facilities with amenities that can impart the experience to the tourists), guest houses (owned by business or government organizations, which can be used by its staff and staff relatives), camping sites (open sites equipped with place to pitch the personal tent, a water supply, and electric supply, and having common rest rooms), and the like.

Reservations are made by tour operators and in some examples, are required to be made well in advance to avoid last-minute hassles. The events or activities such as a music concert or a theatre show, visiting a theme park or a zoo, require people to secure seats or avail entry with prior reservations. Guided tours can be arranged by tour operators. Some qualified staff who can get access to the place, explain the importance of the place, support, and guide the participants through the entire visit. The guide is arranged to accompany the tour participants as a part of tour.

Transport facilities include surface transport (e.g., by road or water) and air transport (commonly for long distance travel). Many times the tours include a halt of a couple of hours at transit destinations. Transport facilities, such as airports, are built and maintained as engaging tourist terminals by providing amenities such as spas, lounges, food joints, bars, and book shops, retail shops for selling authentic local food, clothes, and souvenirs. Related to transport facilities are mobile platform operators, such as airlines. Such operators can offer loyalty programs to their customers to encourage the customers to travel more and accumulate points and redeem them against travel or rewards. Dining facilities can be booked by tour operators and can include local restaurants which are ready to entertain groups. If a tour package is all inclusive, the tour operator pays for breakfast, lunch, and dinner. If not, the tourists need to pay from their own pocket.

Each of these products can be defined and parameterized by the multi-party information that is controlled by a passenger across the passenger's travel journey, according to embodiments described herein.

Returning to FIG. 1D, at block 152, upon selection of the participating individuals or groups based on their digital persona, details about third-party service deals or selections are provided to modify/check-in their ground arrangements (hotel, rental car, pay fees, restaurant times or locations, conference) based on local specials/special events or changed travel conditions. At block 153, ground mobile connectivity is provided by local mobile operator to modify or add services to a passenger's digital persona (e.g., using details of the travel, travel time/date). At block 154, above 2500 ft, another opportunity is provided for the passenger to utilize connected smart device to modify digital personas based on third-party offerings. At block 155, connectivity provided by InFlight IFC to synchronize transaction (new, modified) to be written to the digital ledger provided by the cloud platform. At block 156, below 2500 ft, another opportunity is provided for a passenger to retrieve/modify/update services/products as needed. Using smart mobile device, upon selection of the participating individuals or groups based on their digital persona, details about third-party service deals or selections are provided to modify/check-in their ground arrangements (hotel, rental car, pay fees, conference, restaurant times or locations) based on local specials/special events or changed travel conditions (using details of the travel (e.g., travel time). At block 157, connectivity is provided by local mobile operator to synchronize transaction (new, modified) to be written to the digital ledger provide by the cloud platform.

Figure 2:
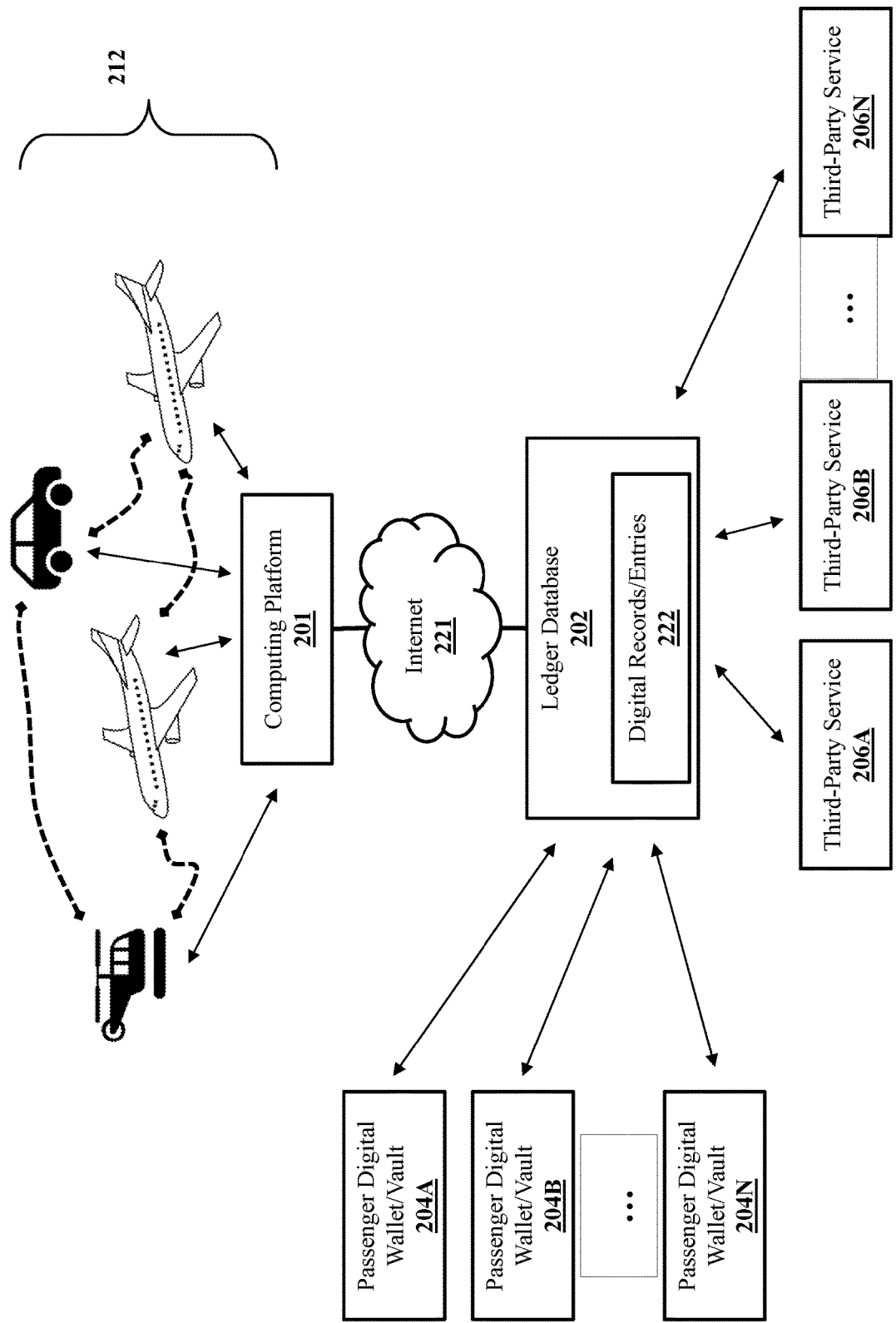
FIG. 2 shows an example implementation of a system in which embodiments described herein can be implemented.

FIG. 2 illustrates an example system in which passengers/users are provided with control over multi-party information during different travel stages and via different data connectivities. According to the system in FIG. 2, the digital ledger is implemented at a ledger database 202. In some embodiments, the ledger database 202 is configured to record information related to digital personas of participants (e.g., mobile platform passengers and users) and multi-party transactions/contracts/agreements involving the digital personas. For example, the ledger database 202 stores digital records/entries 222 each defining a digital persona, a multi-party transaction, a multi-party contract, and/or the like. For example, the ledger database 202 is a transaction record database and can be implemented with one or more of relational databases, non-relational databases, and/or the like.

In some embodiments, the ledger database 202 includes a distributed digital cryptographic ledger, or a blockchain. The blockchain can record the transactions/contracts/agreements between users and third-party services and ensures consensus of the transactions/contracts/agreements recorded thereon. Accordingly, modifications to multi-party transactions are provided herein can be recorded on the blockchain, and blockchain nodes and participants are informed of and have consensus of the modifications. In such examples, the digital records/entries 222 of the ledger database 202 can be implemented as smart contracts and/or association protocols on the blockchain. Implementation of multi-party information as smart contracts on the blockchain enable automated enhancements and execution of various functions. For example, upon modification (according to the disclosed techniques) of programmed parameters defined for a smart contract, the smart contract can execute automated functions to transmit notifications to the third-party service, to automatically execute a transfer of cryptographic tokens (or currency tokens/units, and/or the like), to execute fulfillment or provision of goods/services parameterized in the smart contract, to automatically update other related smart contracts, to interface with a social platform to publish/advertise the agreement, and/or the like. In some embodiments, automatic execution of at least portions of the smart contract are triggered by the location and/or travel stage of an involved user. For example, a smart contract can automatically execute based on a determination that the involved user has exited a mobile platform and expects to receive the parameterized products/services soon.

Passengers on mobile platforms 212 can interact with the digital records/entries 222 via the computing platform 201. The mobile platforms 212 can be communicatively coupled with the computing platform 201 and can transmit modifications to the digital records/entries 222, access/read requests for the digital records/entries 222, and/or the like to the computing platform 201. During a travel journey, a passenger can embark on more than one mobile platform 212 and can remain connected to the ledger database based on each mobile platform 212 being communicatively coupled with the computing platform 201 Multiple mobile platforms 212 on which a passenger embarks can be operated by more than one mobility/operating entity or provider. For example, a passenger first embarks on a driver/driverless car operated by a ridesharing entity (e.g., Uber, Lyft) and then boards a commercial passenger aircraft operated by a different entity (e.g., United, Delta). The different mobility providers or operating entities of mobile platforms 212 participate in the example implementation shown in FIG. 2, such that a passenger can maintain control over a digital persona and multi-party transaction data while moving between mobile platforms 212 operated by different entities. In some examples, the different mobility entities may participate in providing enhanced passenger mobility in order to obtain some benefits shared by an operating entity of the computing platform 201 and/or by third-party services (e.g., revenue shares/splits, profit shares/splits, data transfers or information distribution). In some examples, a first entity implements mobile connectivity systems in a first mobile platform, and a second entity implements mobile connectivity systems in a second mobile platform, and both of the first mobile platform and the second mobile platform are thus configured to connect to the computing platform 201 to each provide passenger control over digital personas and multi-party information.

In some embodiments, different mobile platforms are configured to communicate with one another to notify one another of passenger transfers. For example, a driver/driverless car notifies an eVTOL (or a mobile platform or connectivity system onboard) that a passenger of the car will soon transfer onto the eVTOL. When a mobile platform 212 is notified of an upcoming passenger transfer, the mobile platform 212 can prepare for the techniques described herein, for example, by locally synchronizing multi-party information for the transferring passenger, obtaining digital certificate or authentication data for the transferring passenger, and/or the like. In some embodiments, a mobile platform 212 alternatively or additionally notifies the computing platform 201 of an upcoming passenger transfer to another mobile platform. In some embodiments, a mobile platform determines that a passenger will be transferring to another mobile platform based on obtaining itinerary information from a passenger's user device, based on a notification received from the computing platform 201, and/or the like.

The computing platform 201 communicates with the ledger database 202 via the Internet 221. In some embodiments in which the ledger database 202 is a blockchain, the computing platform 201 includes one or more nodes of the blockchain. In some embodiments, the computing platform 201 uses passenger digital wallets/vaults 204 to modify passenger-specific information recorded on the ledger database 202, for example, when the ledger database 202 implements cryptographic security and cryptographic-related protocols. The ledger database 202 is accessible by third-party services 206, for example, such that third-party services 206 can provide products/services according to multi-party contract/transaction parameters recorded on the ledger database 202.

Figure 3A:
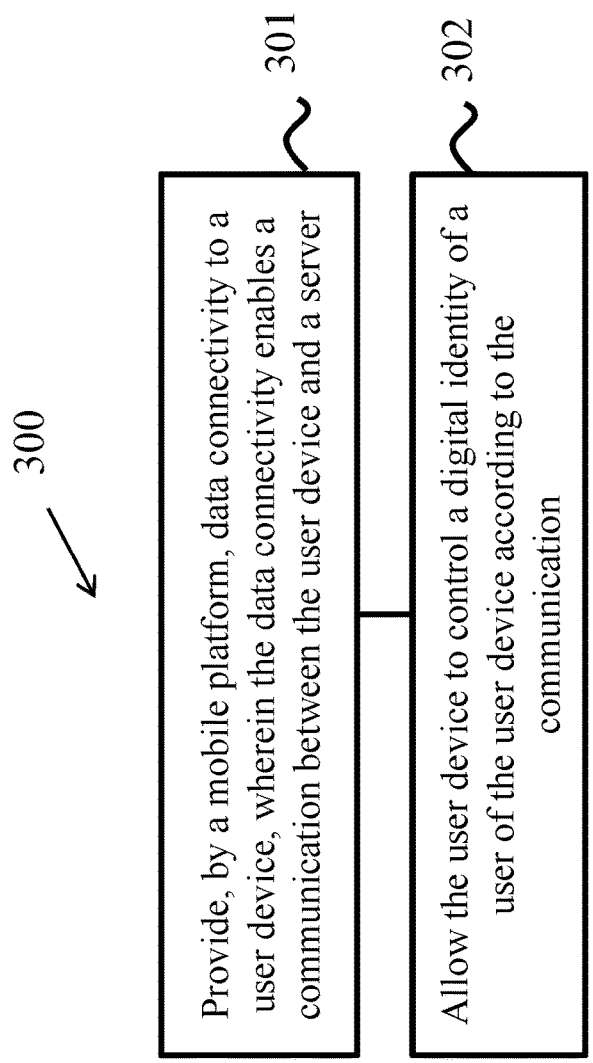
FIG. 3A is a flow diagram illustrating example operations for improving passenger control over digital data while a passenger is mobile.
Figure 3C:
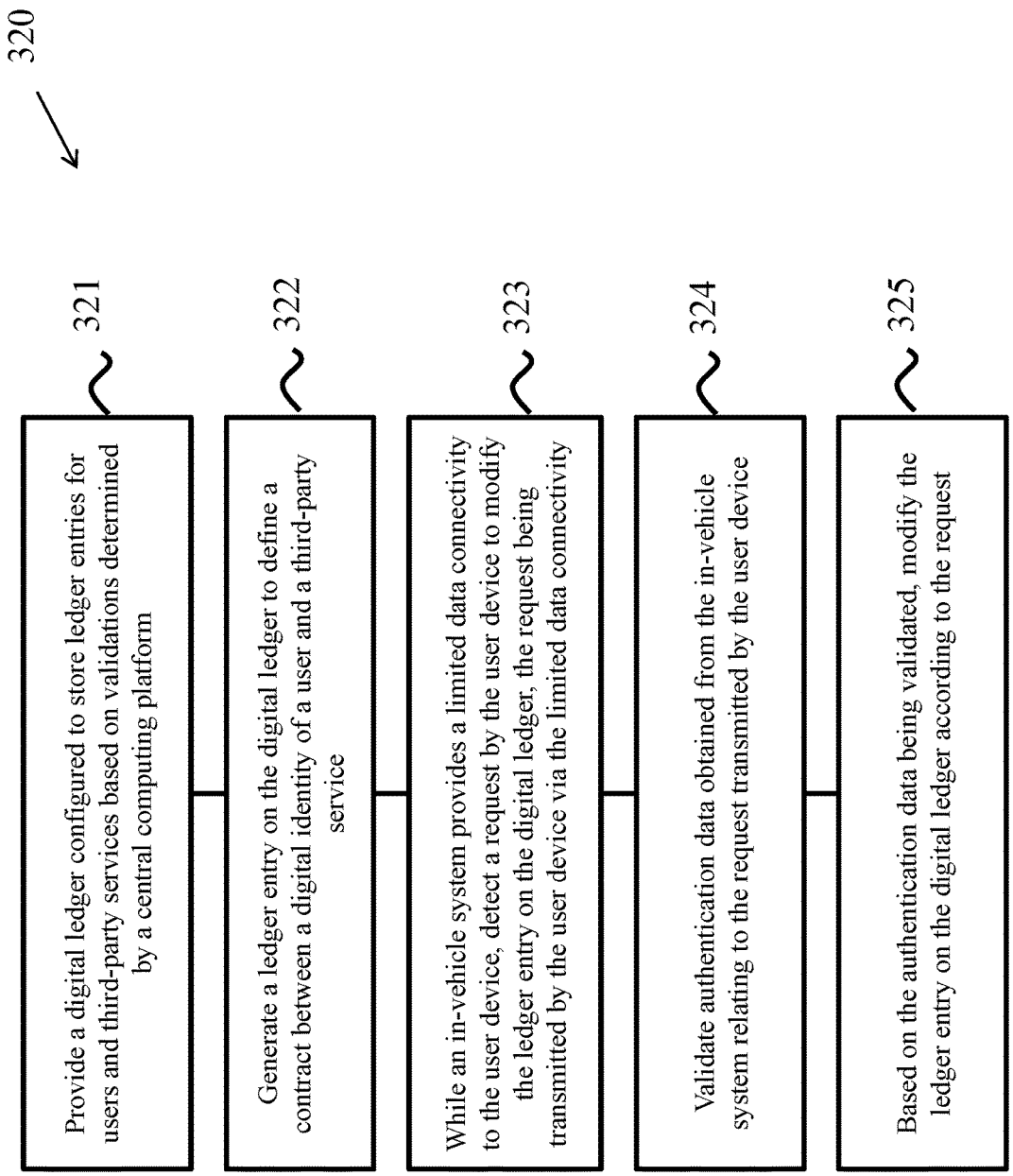
FIG. 3C is a flow diagram illustrated example operations for enabling passenger access and control over multi-party data irrespective of travel journey stage.

FIGS. 3A-3C are flow diagrams illustrating example operations performed to provide passengers with control over multi-party information during different stages of a travel journey and via different data connectivities. Referring first to FIG. 3A, an example method 300 can be implemented by a mobile platform (e.g., an in-vehicle connectivity system, an in-vehicle edge network, an in-flight entertainment system, and/or the like) to provide its passengers with control over multi-party information. At block 301, the mobile platform provides data connectivity to a user device. The data connectivity enables a communication between the user device and a server. The server can be a third-party remote system associated with a third-party service, and via the communication, the user device can define multi-party information for contracts/transactions and/or modify previously-defined contracts/transactions with the third-party service. In some embodiments, the communication is made by the user device via a local user application, a hosted application at the server, and/or the like. At block 302, the mobile platform allows the user device to control a digital identity of a user of the user device according to the communication. For example, the digital identity of the user is a user account belonging to the user and associated with the third-party service. The control of the digital identity can include modification of various parameters associated with the digital identity, including personal information for the user, multi-party information with the third-party service, and/or the like.

Turning now to FIG. 3B, an example method 310 can be implemented by a mobile platform (e.g., an in-vehicle connectivity system, an in-vehicle edge network, an in-flight entertainment system, and/or the like). At block 311, the mobile platform provides data connectivity to a user device that is located onboard the mobile platform, or onboard a commercial passenger vehicle on which the mobile platform system is implemented. The data connectivity enables a communication between the user device and a server associated with a third-party service. At block 312, the mobile platform receives or detects a request from the user device. The request is to modify multi-party ledger data defining a contract or transaction between a digital persona or user identity being represented by the user device and the third-party service. The mobile platform can detect or receive the request via the communication between the user device and the server. At block 313, the mobile platform connects to a remote computing system that provides a digital distributed ledger on which the multi-party ledger data is recorded in order to cause the multi-party ledger data to be modified. In some embodiments, the multi-party ledger data is modified based on an authentication of the user identity on the user device and the third-party service. In some embodiments, the mobile platform performs the authentication based on authentication data (e.g., an authentication token, a digital certificate) included in the request or in the communication between the user device and the server, and indicates the authentication to the cloud computing system. In some embodiments, the mobile platform provides the authentication data to the remote computing system for the remote computing system to perform the authentication.

Turning now to FIG. 3C, an example method 320 can be performed by a central computing platform to implement a central computing platform by which passengers are provided with opportunities throughout their travel journeys to control and modify their digital personas or identities, for example with respect to multi-party information and arrangements. At block 321, the central computing platform provides a digital ledger configured to store ledger entries for users and third-party services based on validations determined by the central computing platform. In some examples, the digital ledger is a distributed cryptographic ledger, such as a blockchain, to which the central computing platform is connected and/or of which the central computing platform is a node. At block 322, the central computing platform generates a ledger entry on the digital ledger to define a contract between a digital identity of a user and a third-party service. In some examples, the central computing platform generates the ledger entry while a user device has a first data connectivity provided by a local network based on detecting or receiving a communication by the user device over the local network, the communication indicating the contract.

At block 323, the central computing platform detects, from an in-vehicle system providing a data connectivity to the user, a request by the user to modify the ledger entry on the digital ledger. In some examples, the central computing platform can detect the request subsequent to the user switching to the data connectivity provided by the in-vehicle system. For example, the data connectivity provided by the in-vehicle system is a second data connectivity, and is a limited data connectivity. At block 324, the central computing platform validates authentication data obtained from the in-vehicle system relating to the request, the authentication data associated with the digital identity of the user and an identity of the third-party service. In some examples, the central computing platform alternatively receives validated authentication data from the in-vehicle system, with the in-vehicle system performing the validation. At block 325, the central computing platform modifies the ledger entry on the digital ledger according to the request, based on the authentication data being validated. The determination by the central computing platform that the authentication data is valid serves as a "third" authentication input in addition to the respective identifies of the user and the third-party service, the digital ledger requiring at least three authentication inputs for control and modification of the ledger entry.

Control of Digital Records of Multi-Party Interactions

Embodiments described herein relate to digital records of real-world interactions between passengers, and to the creation, management, and exchange of these digital records. Commonly, travelers and passengers experience memorable events and interactions during different travel stages of their journey and capture media data, such as images and videos, of the memorable events and interactions on their personal devices. According to embodiments described herein, passenger experience with such experiences is enhanced based on at least the creation of digital records of the real-world event or interactions during a travel journey, the attribution of a digital record to respective digital personas of the involved parties, and the authenticated control and exchange of the digital record with other interested parties. In an illustrative example, the described embodiments enable a passenger to create a digital record of an interaction with a celebrity individual on a mobile platform or during a travel journey and to exchange the digital record with others based on the significance of the interaction.

In particular, creation of the digital record is based on multiple tiers of authentication and verification, with respect to the identities of the involved parties and the co-location and interaction between the involved parties. Based on this authentication and verification, the digital record can be attributed or owned by the digital personas of the involved parties. The involved parties can agree to certain exchange parameters (e.g., permitted users for exchange, a minimum exchange value of the digital record, an attribution percentage for the involved parties, an attribute percentage for mobility providers associated with vehicles on which the interactions occur) for the digital record, and based on a closed-loop system and the agreed parameters, an exchange of the digital record can be automatically executed without active involvement of each involved party. The individual authentication data shared by and among the involved parties during creation of the digital record can be used later to provide a multi-party authorization of the exchange of the digital record.

Similar to the multi-party authorization of digital record exchanges, modifications to the digital record can be carried out efficiently with the authorization of each involved party to the digital record according to the techniques disclosed in the preceding section of the present disclosure. In one example, a first passenger can propose modifying aspects of the digital record, including its appearance and/or its exchange parameters (e.g., an exchange value), and the modifications are carried out based on authentication of each of the parties involved in the digital record.

Figure 4:
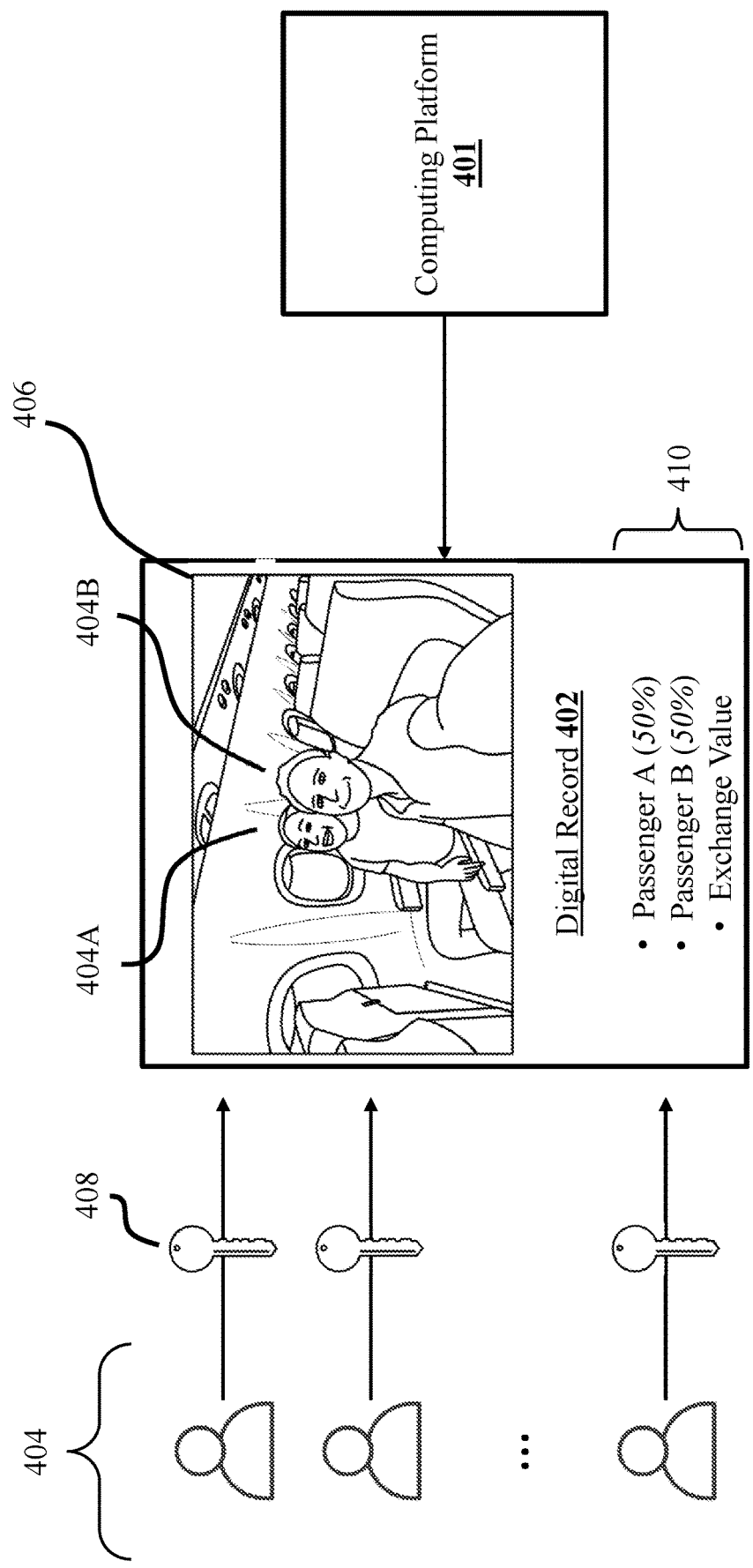
FIG. 4 is a block diagram of an example system for creating and controlling digital records of multi-party interactions between passengers.

FIG. 4 illustrates an example system for the creation and control of digital records of real-world interactions or events. The example system includes a computing platform 401, such as the central computing platform described herein. In particular, the computing platform 401 can be a central platform that is communicably coupled with mobile platforms of various commercial passenger vehicles and with various networks, as exemplified in FIG. 1A. In some embodiments, the computing platform 401 is a cloud platform or is implemented via a cloud computing system.

According to the disclosed embodiments, the computing platform 401 facilitates the creation of digital records 402 of real-world interactions between users or passengers 404. The computing platform 401 represents one party to a n-tier authentication (e.g., triple-entry or triple-authentication) required to create and control a digital record 402 of a real-world interaction between n−1 number of real-world entities (e.g., a number of passengers 404 interacting with one another). The computing platform 401 is configured to authenticate the identity of each of the interacting entities/parties and further authenticate a co-location of the interacting entities/parties, for example onboard a particular vehicle, to thereby affirm a likelihood that the real-world interaction to be captured in a digital record 402 actually occurred. In some embodiments, the computing platform 401 accesses or obtains manifest data for a vehicle that includes a list of passengers, and determines that the interacting entities/parties are all destined or onboard the same vehicle. Accordingly, the computing platform 401 is configured to obtain authentication data from parties to a real-world interaction, verify the authentication data, determine a co-location of the parties to the real-world interaction (e.g., with respect to the parties being onboard or designated for a passenger vehicle), and create the digital record 402. As such, the authentication by the computing platform 401 involved in creating a digital record of a real-world interaction is similar to the triple-entry authentication involved in a computing platform (e.g., platform 101, platform 201) enabling modifications to multi-party ledger entries in that each party as well as the platform provides a respective authentication entry.

In some embodiments, the computing platform 401 further facilitates the occurrence of the real-world interaction itself. Passengers 404 having digital profiles or personas may specify a preference prior to a travel journey that the passengers 404 are open or willing to engage in real-world interactions (e.g., social conversations, networking encounters, business meetings/conferences, teleconferences, virtual meetings, celebrity-fan meetups) in relation to their travel journey (e.g., before, during, and/or after the travel journey). In some embodiments, the computing platform 401 can access the digital personas or profiles of the passengers 404 (e.g., a digital airline-account, a travel account) to determine which of a set of passengers 404 of a commercial passenger vehicle have indicated an interest in interacting with others throughout (e.g., before, during, after) the travel journey of the commercial passenger vehicle. In some embodiments, the computing platform 401 recommends a real-world interaction between two or more passengers 404 based on profiled interests, demographics, and/or the like associated with their respective digital personas. For example, the digital persona for a passenger indicates that the passenger is a fan of a particular football team, and based on a player of the particular football team also being a passenger of the commercial passenger vehicle and being willing to engage in real-world interactions with fans (e.g., as specified in the player's digital profile/persona), the computing platform 401 recommends a real-world interaction between the passenger and the football player. In some embodiments, the computing platform 401 can further recommend a real-world interaction based on extrinsic events related to the travel journey of the passengers; for example, when the computing platform 401 determines that the vehicle is approaching a significant landmark (e.g., a volcano, a large statue, a metropolitan area) based on location data for the vehicle, the computing platform 401 can prompt a real-world interaction between passengers to capture a memorable or significant experience that includes the significant landmark. When recommending a real-world interaction between two or more passengers 404, the computing platform 401 can transmit a notification to a passenger device associated with each of the two or more passengers 404 (e.g., a personal user device such as a smartphone, a seatback device at a seat of a passenger) via a local or edge network, via a mobile platform of the passenger vehicle, or the like.

In the illustrated example, a digital record 402 captures a real-world interaction between a first passenger 404A and a second passenger 404B. The real-world interaction between the first passenger 404A and the second passenger 404B is specifically captured in media data 406, such as an image, a video clip/snippet, or the like of the real-world interaction. The media data 406 can be captured or generated by a passenger device of one or more of the first passenger 404A or the second passenger 404B, and the passenger device(s) can transmit the media data 406 to the computing platform 401 for the media data 406 to be included in the digital record 402. In some embodiments, the digital record 402 is a non-fungible token (NFT) that is minted on a blockchain or a distributed cryptographic ledger. In some embodiments, the digital record 402 is a ledger record/entry stored in a ledger database, such as the ledger database 202 described with FIG. 2. In addition to the media data 406, one or more of the first passenger 404A or the second passenger 404B can specify additional appearance parameters or features (e.g., an image frame, a visually-dynamic animation, an NFT collection badge or attribute) to be associated with the media data 406 and/or the digital record 402 itself.

The illustrated example further demonstrates the n-tier authentication involved in creating the digital record 402. In particular, the digital record 402 is created based on each of the passengers 404 being authenticated via individual authentication data 408, and the computing platform 401 contributing a further authentication input/entry that verifies that the passengers 404 were co-located during their respective travel journeys. Thus, each interacting party (e.g., first passenger 404A, second passenger 404B) as well as the computing platform 401 that facilitates and provides the creation of digital records contributes to the creation of the digital record 402, and one of the first passenger 404A or the second passenger 404B cannot solely execute and carry out the creation of the digital record 402 without the initial involvement and authentication of the other passenger or the computing platform 401. Further, in some embodiments, this authentication is further extensible to require input (e.g., authentication input, creative/parameter input) from other parties. For example, the second passenger 404B may be a celebrity having affiliations/obligations to another party (e.g., a NFT collection custodian) in relation to the creation of digital records, and this additional party may further provide a respective input in support of (or declining support of) the creation of the digital record 402. In this example, the input by the additional party can include an approval to create the digital record 402 as part of a collection or a family of related digital records, for example, an NFT collection. As another example, the second passenger 404B being a celebrity may have an agent or manager that manages the creation, use, and other matters related to digital records for the second passenger 404B, and the agent/manager can provide a respective input in support of the creation of the digital record 402. In some embodiments, these extended authentication parties or inputs are identified by the computing platform 401 via relationships defined between digital personas/profiles of the passengers 404 and extended parties. For example, a passenger's digital persona can specify, in addition to being open to real-world interactions during a travel journey, that digital record creation for the passenger should involve a further party such as an agent or manager. In some embodiments, a mobile operator (e.g., an airline, a ridesharing entity, a train network) of the vehicle on which the passengers are traveling is an involved party, and the digital record (and ownership thereof) can be attributed at least in part to the mobile operator.

The digital record 402 is created with a set of parameters 410, and the set of parameters 410 include parameters that define or control the exchange of the digital record 402 with other parties, parameters that define an appearance of the digital record 402, and/or the like. In the illustrated example, the parameters 410 include an attribution percentage for each of the first passenger 404A and the second passenger 404B. The attribution percentage represents an ownership split of the digital record between the first passenger 404A and the second passenger 404B, which can be applied to divide assets (e.g., currency, another digital record, virtual tokens) exchanged for the digital record 402 between the first passenger 404A and the second passenger 404B. The attribution percentages can be defined during creation of the digital record 402, such that later exchange of the digital record 402 (e.g., as an NFT) can result in automatic compensation of the first passenger 404A and the second passenger 404B. Furthermore, due to the n-tier authentication involved in the creation of the digital record 402, specifying attribution percentages also during creation of the digital record 402 signifies that each of the first passenger 404A and the second passenger 404B agree to the attribution percentages.

Further to attributing the digital record in part to the involved passengers, the parameters 410 can attribute the digital record in part to mobility providers that operate the vehicle(s) on which the involved passengers are traveling, touring entities that advertise an event or landmark captured in the digital record, and/or other third-party entities. Each of these third-party entities (e.g., a mobility provider such as Uber, United Airlines, Delta Airlines) can be associated with an attribution percentage or distribution subdivision that reflects a partial ownership of the digital record, or an obligated distribution of assets exchanged for the digital record. For example, based on a trade or sale of the digital record, a portion of the exchanged assets (e.g., a fiat currency, a cryptocurrency) for the digital record are divided and distributed to third-party entities according to the distribution subdivisions included in the parameters of the digital record.

The attribution percentages or distribution subdivision/shares for third-party entities for mobility providers can be determined by the computing platform 401 based on a degree of participation of the third-party entities in the real-world event or interaction. For example, in an example where the interaction between the first passenger 404A and the second passenger 404B occurs at a travel hub prior to the first and second passengers boarding a passenger vehicle, the mobility provider that operates the passenger vehicle may be associated with a minimal or zero distribution share. As another example, the interaction occurs on the vehicle, and the media data 406 captures one or more identifiers of the mobility provider within the vehicle (e.g., a logo of the mobility provider displayed within the vehicle). The computing platform 401 may determine a distribution share for the mobility provider that corresponds to the appearance of the identifiers (e.g., detected within the media data 406 based on image processing and object classification techniques). These and other factors can contribute to the determination of the distribution subdivision/shares for third-party entities such as mobility providers.

In the illustrated example, the parameters 410 further includes an exchange value that can specify a starting value, a minimum value, a maximum value, or the like of the digital record 402 during an exchange thereof. The exchange value can be specified with respect to a fiat currency (e.g., U.S. dollars), virtual tokens or a cryptocurrency, points, or other assets. Other example parameters can include appearance parameters, including colors, themes, animations, or the like. In some embodiments, the parameters 410 being multi-party information between interacting passengers can be modified and adjusted while the passengers are mobile during their travel journeys and transitioning between different mobile platforms and data connectivities, as discussed in the embodiments included in the present disclosure. In some embodiments, the digital record 402 is an NFT created on a blockchain and associated with a smart contract on the blockchain, and the parameters 410 are defined within or via the smart contract. Accordingly, the smart contract can automatically control exchange, trading, purchasing, selling, or the like of the digital record 402 according to the specified parameters.

As discussed, the digital record 402 can be further exchanged for value with other parties; for example, the digital record 402 is an NFT that can be traded or sold to another interested party (particularly if the digital record 402 belongs to a NFT collection, captures an interaction with a celebrity or artist, and/or the like). In some embodiments, the computing platform 401 facilitates the exchange of the digital record 402 based on publishing the digital record 402 to a record database at which the digital record 402 (or ownership thereof) can be exchanged among different users. For example, the record database is an NFT marketplace platform. In the record database, the digital record 402 can be published by the computing platform 401 according to its appearance parameters, according to the involved passengers (e.g., sorted with multiple digital records involving a particular celebrity), according to its exchange value, according to a collection or family of records, and/or the like. Via the record database, a third-party user can view the digital record 402 and request an exchange for the digital record 402 (e.g., a purchase, a trade).

Due to the earlier specification of the parameters 410 for the digital record 402 (e.g., via a smart contract associated with an NFT digital record) by the involved parties, the computing platform 401 can execute an exchange of the digital record 402 automatically without additional input from the passengers 404 to which the digital record 402 is attributed (e.g., the first passenger 404A and the second passenger 404B). The computing platform 401 can further execute the exchange of the digital record 402 based on the involved/attributed passengers respectively providing their individual authentication data 408. According to example embodiments, the individual authentication data 408 is associated with the digital personas/profiles of the passengers, such as a digital wallet on a blockchain on which the digital record 402 can be exchanged/traded, as exemplified in FIG. 2. For example, the individual authentication data 408 includes a cryptographic key pair (including a public key and a private key) for a passenger's digital wallet on a blockchain. The computing platform 401 can store the individual authentication data 408 for the passengers involved in a digital record 402 and use the individual authentication data 408 to sign off and execute an exchange of the digital record 402 according to the specification of the parameters 410. As such, the digital record 402 can be exchanged even when the passengers are not actively engaged in the exchange, for example, due to a lack of data connectivity during some part of their travel journey, due to busyness, or the like.

Thus, the disclosed embodiments enable passengers to effectively and securely create digital memories of real-world interactions with other passengers during their travel journeys. The created digital memories are valuable and can be conveniently exchanged with others. According to various examples, the digital memories are created as NFTs that are signed by each party and authenticated by a central computing platform that verifies each party's identity and the co-location of the parties. Based on closed-loop sharing of authentication data between the central computing platform and each party, the central computing platform can securely and automatically execute an exchange (e.g., a sale, a trade) of the NFT with interested outside parties.

The described solutions are demonstrated with the following non-illustrative example. Prior to boarding a commercial passenger vehicle (e.g., below 2500 feet), a passenger utilizes their personal device to participate in social interaction record/memory creation before, during, or after their travel journey (e.g., via an eVTOL, an aircraft, a rideshare or carpool); there is a list of participating individuals (or groups) that would like to participate in the social interaction record/memory creation. These participating individuals can include well-known individuals, celebrities, future romantic partners, or the like, where interactions with these participating individuals would constitute a memorable, valuable, and significant experience. The passenger can schedule or arrange an interaction with another participating individual (or group), negotiate and agreed upon parameters of the digital record/memory (e.g., attribution percentage, exchange value), advertise the interaction on a social media platform, and/or the like. These actions prior to boarding the vehicle and/or prior and during the interaction can be enabled via data connectivity provided by a local network. For example, a central computing platform can be notified by the passenger of the upcoming interaction, or via the data connectivity, the central computing platform can arrange/schedule the real-world interaction between passengers.

During the travel journey (e.g., onboard the commercial passenger vehicle, above 2500 ft), the passenger utilizes a passenger device (e.g., their personal device, a vehicle seatback device) to cause creation of the digital record/memory (e.g., an NFT, a video clip, a podcast). The passenger can submit/upload video clips of the interaction, images of the interaction, and/or the like to the central computing platform and can further specify parameters for the digital record/memory such as the attribution percentages, exchange values, and/or appearance parameters (e.g., a background, an image frame). The specified appearance parameters can include journey/location overlays that contribute authenticity to the digital record/memory. Examples of such journey/location overlays can include text blurbs such as "I met John Travolta on Flight Num. AB1234 to Chicago" or "This is me with Kobe Bryant on Jan. 1, 2001 on Flight Num. XY5678 to New York," images or badges such as a logo for a mobile operator (e.g., an airline, a train network, a ridesharing operator) of the vehicle on which the interaction occurred, or the like. Connectivity provided by mobile platforms onboard the passenger vehicle enable this creation of the digital record/memory; the passenger can communicate with the central computing platform (e.g., implemented as a cloud service) via data connectivity provided by a mobile platform to create the digital record/memory. In some embodiments, the mobile platform of the vehicle can provide further information to add authenticity to the interaction and digital record/memory thereof. For example, a digital record/memory can be created/generated based on the vehicle/travel attributes such as a vehicle number (e.g., a flight number, an aircraft tail number, a train car number/identifier), datetime, a vehicle cabin class, a travel destination, and/or the like.

After the travel journey (e.g., exiting the commercial passenger vehicle, below 2500 ft), the passenger can further modify or update the digital record/memory, with authentication input and approval by other passengers involved in the interaction and the digital record/memory. These further modifications or updates can be made as the passengers are in transit on different vehicles and with different mobile platforms.

The described solutions are further demonstrated with the following non-illustrative example. An inflight entertainment (IFE) system of a vehicle can provide a website link where passengers can register/pre-register for social interaction record/memory creation. These passengers can register/pre-register via a companion app locally implemented on their personal devices. Before, during, or after a journey of the vehicle, the IFE system displays, to each registered passenger, a list of other passengers that are registered for social interaction record/memory creation. A passenger can select from this list. Upon selecting, the IFE system can forward or transmit a request to the selected passenger(s) to participate in an interaction and digital record/memory creation, and the IFE system can further arrange/schedule the interaction. During the interaction, the participants can capture or generate media data, such as images or videos, of the interaction. Upon completion, the interacting passengers upload their media data (e.g., images, videos) of the interaction via the companion app on their personal devices, via the IFE system and/or seatback devices, and/or the like, and the interacting passengers select appearance parameters for the digital record/memory. Travel information, such as a destination and or a flight number, is automatically added to the digital record/memory to provide authenticity to the digital record/memory. The digital record/memory (or ownership thereof) is attributed to various parties, including at least the interacting passengers (and potentially including a mobile operator of the vehicle, an entity operating a central computing platform that creates the digital record/memory, users related/associated/affiliated with the interacting passengers). These parties can obtain one or more of the following: a percentage payment or reward for the exchange (e.g., a sale, a trade) of the digital record/memory), a percentage interest upon a modification of ownership/attribution distribution, and/or the like.

Figure 5B:
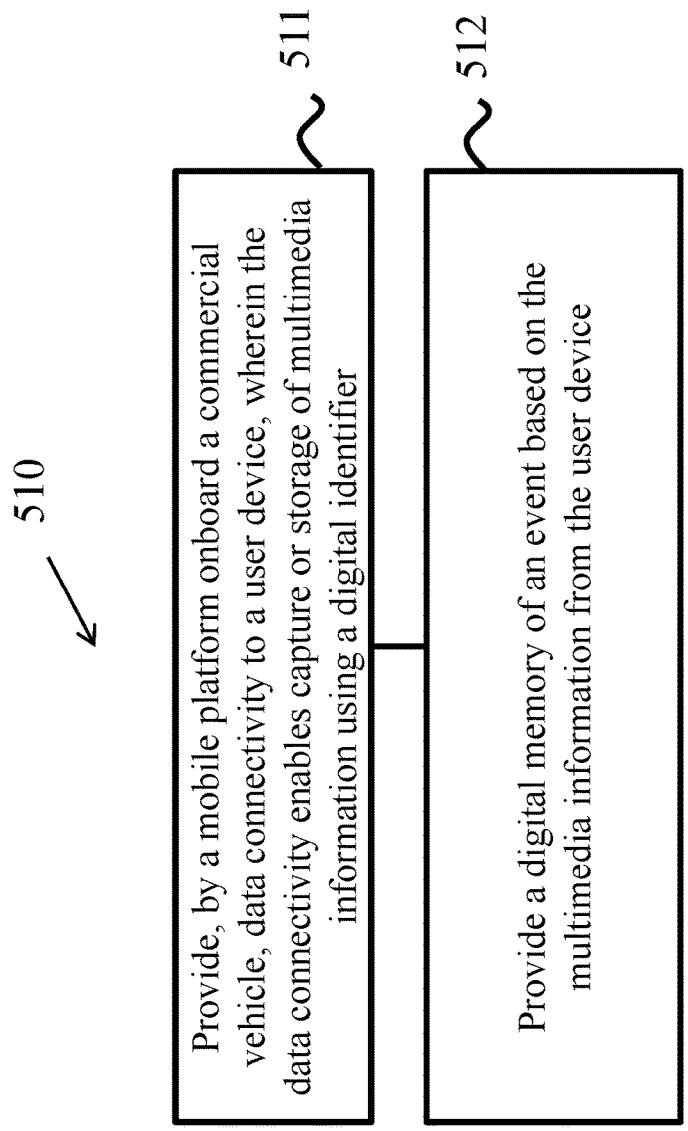
FIG. 5B is a flow diagram illustrating example operations for controlling digital records of multi-party interactions while a passenger is mobile.
Figure 5C:
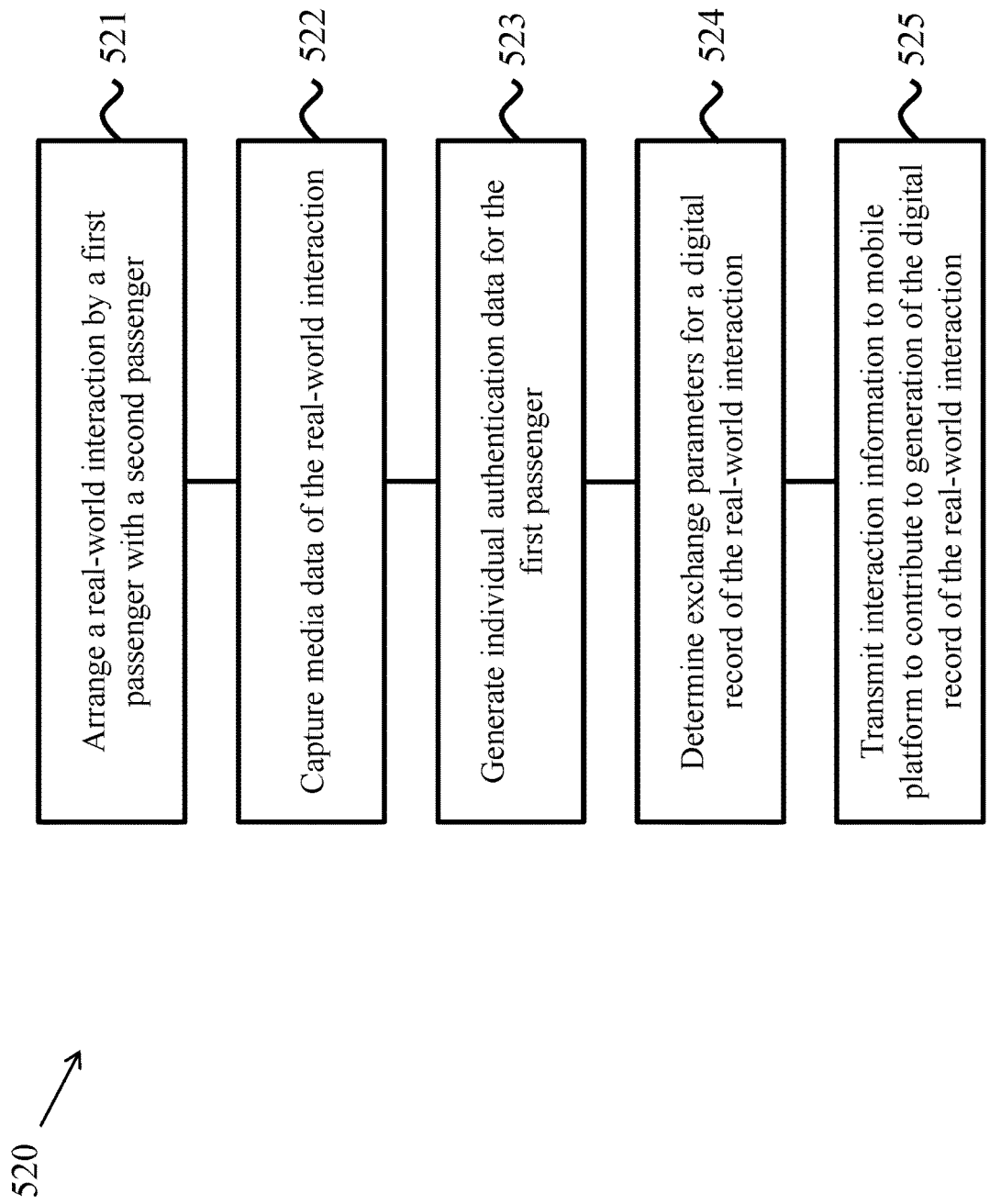
FIG. 5C is a flow diagram illustrating example operations for controlling digital records of multi-party interactions while a passenger is mobile.

FIGS. 5A-5C are flow diagrams illustrating example operations performed for the creation and control of digital records of real-world interactions between passengers during respective travel journeys. Referring first to FIG. 5A, an example method 500 can be implemented by a computing platform, such as a cloud computing system. At block 501, the platform receives media data that captures a real-world interaction between passengers. The platform can receive the media data via local/edge networks, via a mobile platform onboard a vehicle, and/or the like, and the media data originates from a passenger device associated with a passenger involved in the real-world interaction. At block 502, the platform authenticates an identity of each passenger involved in the real-world interaction based on authentication data obtained from each passenger. In some embodiments, the platform authenticates the identity of each passenger based on a cryptographic key pair associated with each passenger or the digital persona (e.g., a blockchain wallet) thereof. In some embodiments, the authentication data includes biometric-based authentication data that affirms the identity of each passenger. At block 503, the platform verifies that the passengers are co-located. In some embodiments, the platform determines that the respective travel journeys of the passengers intersect at some point, for example, on a commercial passenger vehicle, at a travel hub (e.g., an airport, a train station), and/or the like to confirm that the real-world interaction likely occurred. At block 504, the platform generates or creates a digital record of the real-world interaction. In some examples, the digital record is an NFT that the platform mints on a blockchain.

At block 505, the platform publishes the digital record to a record database/platform that enables an exchange of the digital record with third-party users. For example, the platform publishes the digital record to a marketplace where third-party users can offer assets or other digital records in exchange for ownership of the digital record. At block 506, the platform executes, in response to an exchange request from a third-party user, the exchange of the digital record using the authentication data obtained from each passenger. In some embodiments, if the exchange satisfies the parameters specified by the passengers when creating the digital record, the platform automatically executes the exchange based on using the passengers' authentication data (e.g., a cryptographic key pair) to sign off on the exchange.

In some embodiments, execution of the exchange includes referencing the parameters of the digital record to determine an amount of assets to distribute to each of the involved entity (e.g., the interacting passengers, mobility provider(s) of the vehicle(s) on which the interacting passengers are traveling). The platform can determine a distribution amount for each involved entity and distribution assets to the involved entities accordingly. With respect to the interacting passengers, the platform can distribute an amount of cryptocurrency units to the interacting passengers via the digital wallet information previously provided by the interacting passengers. With respect to mobility providers and other entities, the platform can cause a transaction or funds transfer to be executed according to the determined distribution amount.

Turning now to FIG. 5B, an example method 510 can be implemented by a mobile platform (e.g., an in-vehicle connectivity system, an in-vehicle edge network, an in-flight entertainment system, and/or the like). At block 511, the example method 510 includes providing, by a mobile platform onboard a commercial vehicle, data connectivity to a user device. The data connectivity enables capture or storage of multimedia information that relates to a real-world interaction. The multimedia information can identify one or more other user devices (or passengers operating the other user devices) that are involved in the real-world interaction. The multimedia information can include digital identifiers (e.g., for authentication) of passengers involved in the real-world interaction. At block 512, the example method 510 further includes providing a digital memory of an event based on the multimedia information from the user device. The digital memory can be further provided based on other information (including other multimedia information) captured or stored at a different time on the commercial vehicle or at another location by the other passengers involved in the real-world interaction. In some examples, the digital memory is or is represented by a non-fungible token.

Turning now to FIG. 5C, an example method 520 can be performed by a passenger device, including a personal device (e.g., a smartphone, a tablet, a laptop) and/or a seatback device located onboard the vehicle. At block 521, the passenger device arranges a real-world interaction between a first passenger operating the passenger device and a second passenger. The travel journey of the second passenger intersects the travel journey of the first passenger, and the real-world interaction can be arranged based on one or more of the first passenger and the second passenger being notified of this intersection and potential opportunity for the real-world interaction. At block 522, the passenger device captures media data of the real-world interaction. This media data can include images, videos, and/or the like, and the media data can be captured at any stage of the first passenger's travel journey (e.g., before boarding a commercial passenger vehicle, onboard the commercial passenger vehicle). At block 523, the passenger device generates individual authentication data for the first passenger. The individual authentication data is configured to authenticate the identity of the first passenger, and can include biometric-based authentication data, in some examples. In some examples, the individual authentication data includes a cryptographic key pair for a digital persona or digital blockchain wallet of the first passenger.

At block 524, the passenger device determines exchange parameters for a digital record/memory of the real-world interaction. In some embodiments, the exchange parameters are determined in conjunction or in agreement with the second passenger. For example, the passenger device can transmit and receive messages with a second passenger device of the second passenger to negotiate and agreed upon the exchange parameters. The exchange parameters enable a later automatic execution of an exchange of the digital record/memory. At block 525, the passenger device transmits interaction information—including the media data, the individual authentication data, and the exchange parameters—to a mobile platform. For example, the mobile platform provides a data connectivity to the passenger device while the passenger device is located onboard a vehicle, and the interaction information is transmitted to the mobile platform and further to a central platform for record creation.

The passenger device transmitting the interaction information represents the first passenger's contribution to the generation/creation of the digital record of the real-world interaction. According to the disclosed embodiments, the generation/creation of the digital record further requires contribution by the second passenger (e.g., including authentication data to verify the identity of the second passenger) and contribution by the central platform (e.g., to verify the co-location of the first passenger and the second passenger).

Example Systems

Figure 6:
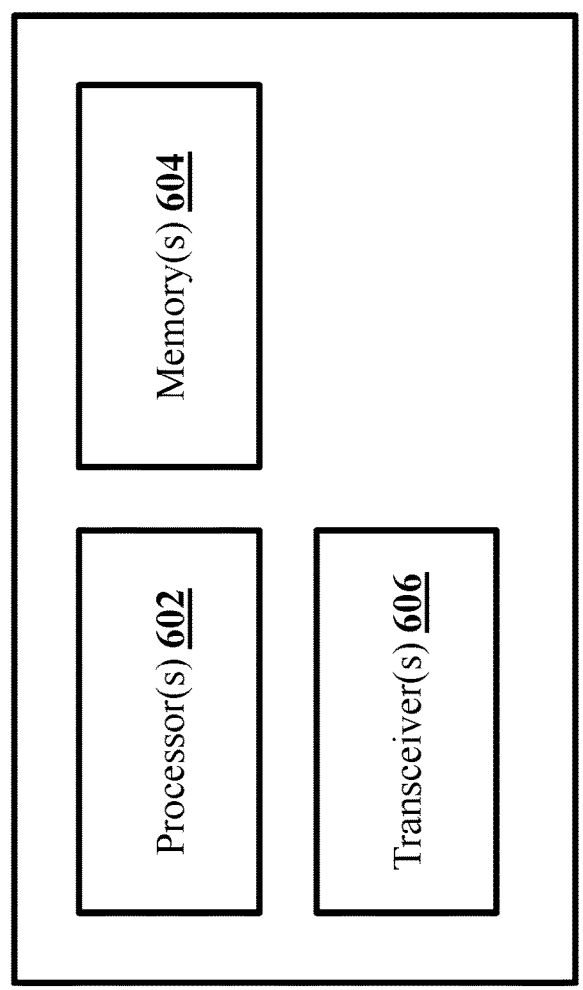
FIG. 6 is a block diagram of a computing system on which embodiments described herein may be implemented.

FIG. 6 illustrates an example of a computing system 600 that implements various embodiments disclosed herein. For example, the computing system 600 is embodied by a central computing system that performs the techniques described herein. The computing system 600 thus can perform various operations relating to maintaining and providing a digital ledger for multi-party information and authenticating user identities and third-party services. As another example, the computing system 600 is embodied by an in-vehicle system, such as or including a connectivity system providing data connectivity to user devices. Thus, the computing system 600 can perform various operations relating to providing data connectivity to users onboard a commercial passenger vehicle and connecting to a remote computing platform that maintains a digital ledger. In yet another example, the computing system 600 is embodied by a user device, and the computing system 600 performs operations related to using different data connectivities provided by different networks and requesting modifications to multi-party information recorded on a digital ledger. In yet another example, the computing system 600 is embodied by a third-party server system and performs operations related to communicating with user devices to define and/or modify multi-party data.

In FIG. 6, the computing system 600 includes at least one processor 602 and a memory 604 having instructions stored thereupon. The memory 604 may store instructions to be executed by the processor 602. In other embodiments, additional, fewer, and/or different elements may be used to configure the computing system 600. The memory 604 is an electronic holding place or storage for information or instructions so that the information or instructions can be accessed by the processor 602. The memory 604 can include, but is not limited to, any type of random-access memory (RAM), any type of read-only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 602 configure the computing system 600 to perform the example operations described in this patent document.

The instructions executed by the processor 602 may be carried out by a special purpose computer, logic circuits, or hardware circuits. The processor 602 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 602 can perform the operations called for by that instruction. The processor 602 operably couples with the memory 604 and transceiver 606 to receive, to send, and to process information and to control the operations of the computing system 600. The processor 602 may retrieve a set of instructions from a permanent memory device such as a ROM device and copy the instructions in an executable form to a temporary memory device that is generally some form of RAM. In some implementations, the computing system 600 can include a plurality of processors that use the same or a different processing technology.

The transceiver 606 transmits and receives information or data to another device. The transceiver 606 can transmit and receive signals over different networks, including Wi-Fi networks, cellular networks, in-flight connectivity or edge networks, and/or the like. The transceiver 606 may be comprised of a transmitter and a receiver; in some embodiments, the computing system 600 comprises a transmitter and a receiver that are separate from another but functionally form a transceiver.

Figure 7:
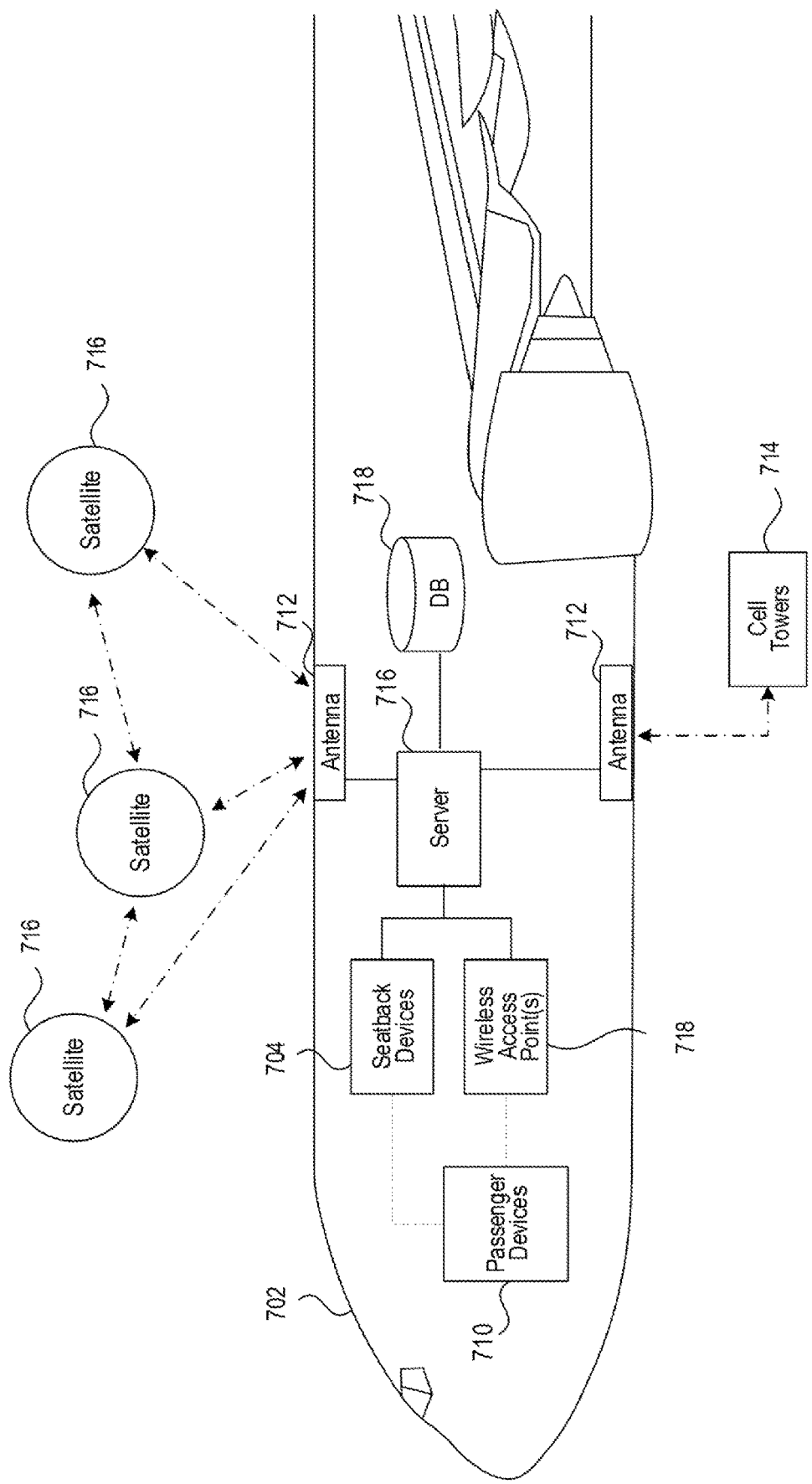
FIG. 7 is a block diagram of a mobile platform via which a passenger can access and control multi-party digital ledger data.

FIG. 7 illustrates an exemplary overview of an in-flight connectivity system (or an in-flight entertainment (IFE) system, an in-vehicle edge network, or the like) installed in a vehicle 702 The illustrated in-flight connectivity system can provide data connectivity to passenger devices 710 onboard the vehicle 702, and in particular data connectivity via which the passenger devices 710 can control multi-party information related to contracts and transactions with third-party services and associated with digital identities of the users. In the example, the vehicle 702 is a commercial passenger vehicle, and specifically an aircraft.

The in-flight connectivity system includes a plurality of seatback devices 704. In some embodiments, the seatback devices 704 include an in-device terminal or computing unit. In some embodiments, the seatback devices 704 are communicably coupled to computing units (e.g., computers) that may be located in a seat below one or more seatback devices 704. For example, one or more seatback devices 704 located in a row in the vehicle 702 may be communicable coupled to one computing unit located below a seat in the row. In another example, each seatback device 704 may be communicably coupled to a respective computing unit that is located in the seat where the seatback device 704 is located. In some embodiments, a seatback device 704 enables access to a digital persona or identity of a user by the user, and the user can control the digital persona or identity (e.g., modify contracts/transactions in which the digital persona is involved) according to the techniques described herein.

Each of the plurality of seatback devices 704 (or computing units to which the seatback devices 704 are coupled) may include an ethernet connector which allows the plurality of seatback devices 704 to be communicably coupled to a server 706 via, for example, an Ethernet switch. In some embodiments, the server 706 stores data used to enable and provide device-based authenticated access to passenger-specific information. For example, the server 706 stores authentication data pertaining to tokens or digital certificates previously signed and issued by an issuing/certificate authority (e.g., an issuing authority associated with a cloud platform described herein) to a given passenger or passenger device. In some embodiments, the server 706 includes one or more processing units configured to implement example operations disclosed herein, for example, to validate the identity of passengers in order to provide control over multi-party information to the passengers.

In some embodiments, the server 706 is communicably coupled (e.g., via Ethernet switch) to one or more wireless access points 708. Thus, in such embodiments, passengers may use passenger devices 710 (e.g., computers, laptops, mobile phones, tablets) to connect to the one or more wireless access points 708 so that the passenger devices 710 can communicate with the plurality of seatback devices 704 via the server 706. In some embodiments, a passenger may operate one or more passenger devices 710 (e.g., smartphones, laptops, tablets, communication devices, entertainment devices) while on-board the vehicle, and the passenger devices 710 of a passenger is connected to a seatback device 704 and/or the server 706 of the in-flight connectivity system.

In some embodiments, each of the plurality of seatback devices 704 is configured such that a passenger device 710 can directly communicate with a seatback device 704 (or a computing unit to which the seatback device 704 is coupled). For example, each seatback device 704 is configured for Bluetooth or Bluetooth Low Energy (BLE) communication with passenger devices 710. Accordingly, a seatback device 704 is configured to detect nearby candidate passenger devices, establish a connection or pairing with a passenger device 710, and transmit/receive data via the connection or pairing with the passenger device 710. In some examples, a seatback device 704 is configured for direct communication with passenger devices 710 via other means, such as a near-field communication (NFC) device via which a passenger device 710 directly communicates with the seatback device 704.

In some embodiments, the server 706 provides data connectivity to the passenger devices 710 connected thereto (e.g., via wireless access points 708, via seatback devices 704). The server 706 provides the data connectivity based on the server 706 being communicatively coupled via antennas 712 of the vehicle 702 to other networks, such as a cellular network accessed via cell towers 714 or an edge network that includes satellites 716. The server 706 can connect to one or more of the cell towers 714 for a cellular network or the satellites 716 for an edge network, depending on a location of the vehicle 702. For example, when the vehicle 702 is at a location outside of a range of the cellular network (and its cell towers 714), the server can connect to the satellite edge network. In some examples, the data connectivity provided by the server 706 is a limited data connectivity based on whitelisted IP domains.

As illustrated, the server 706 is coupled with an onboard database 718. In some embodiments, the server 706 synchronizes passenger-specific information for passengers in the onboard database 718, and the server 706 can obtain the passenger-specific information from the cloud platform. In some examples, the passenger-specific information includes synchronized copies of certain ledger entries of the digital ledger provided by the cloud platform that are related to a given passenger. In some examples, the passenger-specific information includes passenger digital wallet/vault information, such as cryptographic keys or the like that can be used to authenticate passengers. In some embodiments, the server 706 can further obtain and store (in the onboard database 718) data related to third-party services with which passengers may communicate during a travel journey on the vehicle 702. For example, the server 706 can obtain and store cryptographic key data associated with a particular third-party service, digital certificate data associated with a signed certificate issued to a particular third-party service, and/or the like.

Some preferred embodiments of the present disclosure implement the following solutions.

1. A computing system comprising at least one processor and at least one memory storing instructions that, when executed by the at least one processor, cause the computing system to: provide a digital ledger configured to store ledger entries for users and third-party services based on validations determined by the computing system; while a user has a first data connectivity provided by a network, generate a ledger entry on the digital ledger to define a contract between a digital identity of the user and a third-party service; subsequent to the user switching to a second data connectivity provided by an in-vehicle system of a commercial passenger vehicle in which the user is located: detect, from the in-vehicle system, a request by the user (e.g., via a personal device of the user, via a seatback monitor or in-vehicle device used by the user) to modify the ledger entry on the digital ledger; validate authentication data obtained from the in-vehicle system relating to the request, the authentication data associated with the digital identity of the user and an identity of the third-party service; and based on the authentication data being validated, modify the ledger entry on the digital ledger according to the request.

2. The computing system of solution 1, wherein the authentication data includes a digital certificate assigned to the third-party service by the computing system and stored, on a user device of the user with the second data connectivity, by a client application that is associated with the third-party service.

3. The computing system of any of solutions 1-2, wherein the request is detected from the in-vehicle system based on a network edge connection between the in-vehicle system and the computing system.

4. The computing system of any of solutions 1-3, wherein the request is detected subsequent to the user being located in the commercial passenger vehicle and the commercial passenger vehicle being located outside of a coverage range of the network.

5. The computing system of any of solutions 1-4, wherein the digital ledger is a distributed ledger maintained by a plurality of computing systems that includes a third-party computing system associated with the third-party service, wherein the modified ledger entry is retrieved by the third-party computing system for the third-party service to provide a modified product or service to the user.

6. The computing system of any of solutions 1-5, wherein the request is detected based on a user device of the user communicating with, via the second data connectivity provided by the in-vehicle system, a hosted application associated with the third-party service and through which the contract is defined.

7. The computing system of any of solutions 1-6, wherein the instructions cause the computing system to: obtain a timestamp and a vehicle location for the request from the in-vehicle system; and include the timestamp and the vehicle location with the modified ledger entry on the digital ledger.

8. The computing system of any of solutions 1-7, wherein the network is a terrestrial cellular network that provides the first data connectivity for the user while the vehicle in which the user device is located is below a particular altitude, and wherein the computing system generates the ledger entry based on being communicatively coupled with a hosted application associated with the third-party service and through which the contract is defined.

9. The computing system of any of solutions 1-8, wherein the instructions cause the computing system to: receive, from a third-party system associated with the third-party service, an indication of a second contract between the digital identity of the user and the third-party service; while the second data connectivity is provided to the user, cause the in-vehicle system to provide the indication of the second contract to the user based on validating the digital identity of the user and the indication received from the third-party system; and in response to detecting from the in-vehicle system that the user accepted the second contract via the second data connectivity, generate a second ledger entry on the digital ledger for the second contract.

10. The computing system of any of solutions 1-9, wherein the computing system and the in-vehicle system are associated with an issuing authority that generated the authentication data.

11. The computing system of any of solutions 1-10, wherein the user transfers to one or more other commercial passenger vehicles (e.g., cars, trains, eVTOLs, airplanes) operated by a mobility entity different than that of the commercial passenger vehicle, and wherein the computing system is communicatively coupled with respective in-vehicle systems of the one or more other commercial passenger vehicles.

12. An in-vehicle system for a commercial passenger vehicle, the in-vehicle system comprising a processor and a memory storing instructions that, when executed by the processor, cause the in-vehicle system to: provide data connectivity to a user device located onboard a commercial passenger vehicle on which the in-vehicle system is implemented, wherein the data connectivity enables a communication between the user device and a server associated with a third-party service; receive, from the user device, a request to modify multi-party ledger data recorded on a digital distributed ledger, the multi-party ledger data defining a contract between a user identity represented by the user device and the third-party service; and connect to a remote computing system that provides the digital distributed ledger to modify the multi-party ledger data, the remote computing system being located external to the commercial passenger vehicle.

13. The in-vehicle system of solution 12, wherein connecting to the cloud computing platform includes providing authentication data associated with the user identity and the third-party service to the remote computing platform.

14. The in-vehicle system of solution 13, wherein the instructions cause the in-vehicle system to: obtain the authentication data with the request, the authentication data including a digital certificate associated with the server and that is validated by the cloud computing platform prior to the multi-party ledger data being modified.

15. The in-vehicle system of solution 13, wherein the authentication data includes a digital certificate associated with the user identity and provided by the user device based on a biometric security input by a user of the user device.

16. The in-vehicle system of any of solutions 12-15, wherein the instructions cause the in-vehicle system to: determine a timestamp and a vehicle location at which the request was received; and transmit the timestamp and the vehicle location to the cloud computing platform to cause the cloud computing platform to include the timestamp and the vehicle location with the multi-party ledger data.

17. The in-vehicle system of any of solutions 12-16, wherein the in-vehicle system provides the data connectivity to the user device subsequent to the commercial passenger vehicle being outside of a coverage range of a network that previously provided a second data connectivity to the user device, wherein the multi-party ledger data was previously recorded on the digital distributed ledger via the second data connectivity provided by the network to the user device.

18. The in-vehicle system of any of solutions 12-17, wherein the commercial passenger vehicle is associated with a first mobility entity, and wherein the instructions cause the in-vehicle system to: determine that a user of the user device will be transferring to a second commercial passenger vehicle that is operated by a second mobility entity; and notify a second in-vehicle system implemented on the second commercial passenger vehicle regarding the user transferring to the second commercial passenger vehicle.

19. The in-vehicle system of any of solutions 12-18, wherein the in-vehicle system provides the data connectivity to the user device subsequent to a user of the user device transferring onboard the commercial passenger vehicle from a different commercial passenger vehicle that is operated by a different mobility entity than that of the commercials passenger vehicle.

20. A method comprising: providing, by a processor of a central computing platform, a digital ledger configured to store ledger entries for users and third-party services based on validations determined by the central computing platform; generating, by the central computing platform, a ledger entry on the digital ledger to define a contract between a digital identity of a user and a third-party service; while an in-vehicle system of a vehicle provides a limited data connectivity to the user, detecting, by the central computing platform from the in-vehicle system, a request by the user to modify the ledger entry on the digital ledger, the request being transmitted by the user device via the limited data connectivity; validating, by the central computing platform, authentication data obtained from the in-vehicle system relating to the request by the user; and based on the authentication data being validated, modifying, by the central computing platform, the ledger entry on the digital ledger according to the request.

21. The method of solution 20, wherein the authentication data includes a digital certificate assigned to the third-party service by the central computing platform.

22. The method of any of solutions 20-21, wherein the ledger entry is generated in response to communications between the user and the third-party service via a data connectivity provided by a network while the user is outside of the vehicle.

23. The method of any of solutions 20-22, wherein the central computing platform detects the request from the in-vehicle system based on a network edge connection between the in-vehicle system and the central computing platform.

24. The method of any of solutions 20-23, wherein the commercial passenger vehicle is one of a plurality of commercial passenger vehicles on which the user embarks before the contract is fulfilled (e.g., the user reaching a destination at which the third-party service is located and at which the third-party service will provide goods or services to the user according to the contract), and wherein the plurality of commercial passenger vehicles are operated by one or more mobility entities.

25. A method comprising: receiving, via a mobile platform onboard a commercial passenger vehicle, media data that captures a real-world interaction between two or more passengers of the commercial passenger vehicle, the media data originating from at least one user device associated with the two or more passengers; generating a digital record (e.g., an image-based record, a video-based record, an NFT) of the real-world interaction based on authenticating an identity and a location of each of the two or more passengers in the real-world interaction, wherein the digital record is (i) attributed to respective digital profiles (e.g., a digital account/persona, a digital blockchain wallet) of the two or more passengers of the real-world interaction and (ii) generated to include the media data and a set of parameters that control an exchange (e.g., a trade, a sale) of the digital record; and publishing the digital record to a record database that enables third-party users to request the exchange of the digital record with the respective digital profiles of the two or more passengers.

26. The method of solution 25, wherein the identity of each of the two or more passengers is authenticated from individual authentication data received from user devices of the two or more passengers via the mobile platform, and wherein the location of each of the two or more passengers is authenticated based on determining that the respective digital profiles of the two or more passengers are included in manifest information for the commercial passenger vehicle.

27. The method of any of solutions 25-26, wherein the set of parameters are specified by the two or more passengers via the mobile platform, the set of parameters including an attribution percentage for each of the two or more passengers and an exchange value for the digital record.

28. The method of any of solutions 25-27, further comprising: in connection with generating the digital record of the real-world interaction, storing individual authentication data associated with the respective digital profiles of the two or more passengers, the individual authentication data being used to generate the digital record; receiving, via the record database, a third-party request for the exchange of the digital record; and executing the exchange of the digital record according to the set of parameters of the digital record using the individual authentication data for the respective digital profiles of the two or more passengers.

29. The method of solution 28, wherein the exchange is automatically executed according to the set of parameters of the digital record, in response to determining that the two or more passengers do not have data connectivity onboard the commercial passenger vehicle.

30. The method of solution 28, wherein the exchange of the digital record is executed in response to at least one of the two or more passengers approving the exchange.

31. The method of any of solutions 25-31, further comprising: identifying a subset of passengers of the commercial passenger vehicle having respective digital profiles configured to permit digital recording of real-world interactions; and prompting the real-world interaction to each of the two or more passengers based on the two or more passengers being included in the subset of passengers.

32. The method of solution 31, wherein the subset of passengers are identified prior to the subset of passengers boarding the commercial passenger vehicle.

33. The method of any of solutions 25-32, further comprising: prompting the two or more passengers to perform the real-world interaction based on the commercial passenger vehicle traveling near a pre-determined destination.

34. The method of any of solutions 25-33, wherein the real-world interaction occurs outside of the commercial passenger vehicle before the two or more passengers enter the commercial passenger vehicle.

35. The method of any of solutions 25-34, wherein the digital record is a non-fungible token (NFT), and wherein publishing the digital record comprises minting the NFT on a blockchain.

36. The method of any of solutions 25-35, wherein the parameters include a distribution subdivision for a mobility provider that operates the commercial passenger vehicle, and wherein the method further comprises: determining the distribution subdivision for the mobility provider based on whether the real-world interaction occurred onboard the commercial passenger vehicle while the commercial passenger vehicle is operated by the mobile provider (and/or based on other factors such as whether or not (or how frequent) items, identifiers, merchandise associated with the mobility provider appear in the media data for the digital record); and during an execution of the exchange of the digital record, determine a distribution amount to issue to the mobility provider based on applying the distribution subdivision included in the parameters of the digital record to an exchange value of the digital record.

37. A computing system comprising at least one processor and at least one memory storing instructions that, when executed by the at least one processor, cause the computing system to perform the method of any of solutions 25-36.

38. A non-transitory computer-readable medium storing instructions that, when executed by a processor, cause the processor to perform the method of any of solutions 25-36.

39. A method comprising: generating media data that captures a real-world interaction between a first passenger operating the computing device and a second passenger of a commercial passenger vehicle; determining parameters that control an exchange of a digital record of the real-world interaction with third-party users; and transmitting, to a mobile platform onboard the commercial passenger vehicle via a data connectivity provided by the mobile platform, the media data and the parameters to cause the digital record of the real-world interaction to be generated, wherein the digital record is generated in response to the mobile platform further obtaining individual authentication data for the second passenger.

40. The method of solution 39, wherein the parameters are determined based on an agreement between the first passenger and the second passenger, the parameters including an attribution percentage for each of the first passenger and the second passenger and an exchange value for the digital record.

41. The method of any of solutions 39-40, further comprising: providing, to the mobile platform, individual authentication data for the first passenger; and enabling the second passenger to, using the individual authentication data for the first passenger in combination with the individual authentication data for the second passenger, execute the exchange of the digital record of the real-world interaction according to the parameters.

42. The method of solution 41, wherein the digital record is a non-fungible token, and wherein the individual authentication data for the first passenger is a cryptographic key pair for a digital wallet of the first passenger on a blockchain on which the digital record is minted 43. A computing device comprising at least one processor and at least one memory storing instructions that, when executed by the at least one processor, cause the computing device to perform the method of any of solutions 39-42.

44. A non-transitory computer-readable medium storing instructions that, when executed by a processor, cause the processor to perform operations implemented/performed by the computing system of any of solutions 39-42.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A computing system comprising at least one processor and at least one memory storing instructions that, when executed by the at least one processor, cause the computing system to:
   receive, via a mobile platform onboard a commercial passenger vehicle, media data that captures a real-world interaction between two or more passengers of the commercial passenger vehicle, the media data originating from at least one user device associated with the two or more passengers;
   generate a digital record of the real-world interaction based on authenticating an identity and a location of each of the two or more passengers in the real-world interaction, wherein the digital record is (i) attributed to respective digital profiles of the two or more passengers of the real-world interaction and (ii) generated to include the media data and a set of parameters that control an exchange of the digital record;
   in connection with generating the digital record of the real-world interaction, store individual authentication data associated with the respective digital profiles of the two or more passengers, the individual authentication data being used to generate the digital record;
   publish the digital record to a record database that enables third-party users to request the exchange of the digital record with the respective digital profiles of the two or more passengers;
   receive, via the record database, a third-party request for the exchange of the digital record; and
   execute the exchange of the digital record according to the set of parameters of the digital record using the individual authentication data for the respective digital profiles of the two or more passengers.

2. The computing system of claim 1, wherein the computing system authenticates the identity of each of the two or more passengers from individual authentication data received from user devices of the two or more passengers via the mobile platform, and wherein the computing system authenticates the location of each of the two or more passengers based on determining that the respective digital profiles of the two or more passengers are included in manifest information for the commercial passenger vehicle.

3. The computing system of claim 1, wherein the set of parameters are specified by the two or more passengers via the mobile platform, the set of parameters including an attribution percentage for each of the two or more passengers and an exchange value for the digital record.

4. The computing system of claim 1, wherein the computing system automatically executes the exchange of the digital record according to the set of parameters of the digital record, in response to determining that the two or more passengers do not have data connectivity onboard the commercial passenger vehicle.

5. The computing system of claim 1, wherein the computing system executes the exchange of the digital record in response to at least one of the two or more passengers approving the exchange.

6. The computing system of claim 1, wherein the instructions further cause the computing system to:
identify a subset of passengers of the commercial passenger vehicle having respective digital profiles configured to permit digital recording of real-world interactions; and
prompt the real-world interaction to each of the two or more passengers based on the two or more passengers being included in the subset of passengers.

7. The computing system of claim 6, wherein the subset of passengers are identified prior to the subset of passengers boarding the commercial passenger vehicle.

8. The computing system of claim 1, wherein the instructions further cause the computing system to:
prompt the two or more passengers to perform the real-world interaction based on the commercial passenger vehicle traveling near a pre-determined destination.

9. The computing system of claim 1, wherein the real-world interaction occurs outside of the commercial passenger vehicle before the two or more passengers enter the commercial passenger vehicle.

10. The computing system of claim 1, wherein the digital record is a non-fungible token (NFT), and wherein publishing the digital record comprises minting the NFT on a blockchain.

11. A method comprising:
receiving, via a mobile platform onboard a commercial passenger vehicle, media data that captures a real-world interaction between two or more passengers of the commercial passenger vehicle, the media data originating from at least one user device associated with the two or more passengers;
generating a digital record of the real-world interaction based on authenticating an identity and a location of each of the two or more passengers in the real-world interaction, wherein the digital record is (i) attributed to respective digital profiles of the two or more passengers of the real-world interaction and (ii) generated to include the media data and parameters that control an exchange of the digital record;
in connection with generating the digital record of the real-world interaction, storing individual authentication data associated with the respective digital profiles of the two or more passengers, the individual authentication data being used to generate the digital record;
publishing the digital record to a record database that enables third-party users to request the exchange of the digital record with the respective digital profiles of the two or more passengers;
receiving, via the record database, a third-party request for the exchange of the digital record; and
executing the exchange of the digital record according to the parameters of the digital record using the individual authentication data for the respective digital profiles of the two or more passengers.

12. The method of claim 11, wherein the identity of each of the two or more passengers is authenticated from individual authentication data received from user devices of the two or more passengers via the mobile platform, and wherein the location of each of the two or more passengers is authenticated based on determining that the respective digital profiles of the two or more passengers are included in manifest information for the commercial passenger vehicle.

13. The method of claim 11, wherein generating the digital record includes receiving the parameters from the two or more passengers via the mobile platform, the parameters including an attribution percentage for each of the two or more passengers and an exchange value for the digital record.

14. The method of claim 11, further comprising:
identifying a subset of passengers of the commercial passenger vehicle having respective digital profiles configured to permit digital recording of real-world interactions; and
prompting the real-world interaction to each of the two or more passengers based on the two or more passengers being included in the subset of passengers.

15. The method of claim 11, wherein the parameters includes a distribution subdivision for a mobility provider that operates the commercial passenger vehicle, and wherein the method further comprises:
determining the distribution subdivision for the mobility provider based on whether the real-world interaction occurred onboard the commercial passenger vehicle while the commercial passenger vehicle is operated by the mobility provider; and
during an execution of the exchange of the digital record, determine a distribution amount to issue to the mobility provider based on applying the distribution subdivision included in the parameters of the digital record to an exchange value of the digital record.

16. A computing device comprising at least one processor and at least one memory storing instructions that, when executed by the at least one processor, cause the computing device to:
generate media data that captures a real-world interaction between a first passenger operating the computing device and a second passenger of a commercial passenger vehicle;
determine parameters that control an exchange of a digital record of the real-world interaction with third-party users;
transmit, to a mobile platform onboard the commercial passenger vehicle via a data connectivity provided by the mobile platform, the media data and the parameters to cause the digital record of the real-world interaction to be generated, wherein the digital record is generated in response to the mobile platform further obtaining individual authentication data for the second passenger;
provide, to the mobile platform, individual authentication data for the first passenger; and
enable the second passenger to, using the individual authentication data for the first passenger in combination with the individual authentication data for the second passenger, execute the exchange of the digital record of the real-world interaction according to the parameters.

17. The computing device of claim 16, wherein the parameters are determined based on an agreement between the first passenger and the second passenger, the parameters including an attribution percentage for each of the first passenger and the second passenger and an exchange value for the digital record.

18. The computing device of claim 16, wherein the digital record is a non-fungible token, and wherein the individual authentication data for the first passenger is a cryptographic key pair for a digital wallet of the first passenger on a blockchain on which the digital record is minted.

19. A method comprising:
  receiving, via a mobile platform onboard a commercial passenger vehicle, media data that captures a real-world interaction between two or more passengers of the commercial passenger vehicle, the media data originating from at least one user device associated with the two or more passengers;
  generating a digital record of the real-world interaction based on authenticating an identity and a location of each of the two or more passengers in the real-world interaction, wherein the digital record is (i) attributed to respective digital profiles of the two or more passengers of the real-world interaction and (ii) generated to include the media data and parameters that control an exchange of the digital record, wherein the parameters include a distribution subdivision for a mobility provider that operates the commercial passenger vehicle;
  publishing the digital record to a record database that enables third-party users to request the exchange of the digital record with the respective digital profiles of the two or more passengers;
  determining the distribution subdivision for the mobility provider based on whether the real-world interaction occurred onboard the commercial passenger vehicle while the commercial passenger vehicle is operated by the mobility provider; and
  during an execution of the exchange of the digital record, determine a distribution amount to issue to the mobility provider based on applying the distribution subdivision included in the parameters of the digital record to an exchange value of the digital record.

20. The method of claim 19, wherein the identity of each of the two or more passengers is authenticated from individual authentication data received from user devices of the two or more passengers via the mobile platform, and wherein the location of each of the two or more passengers is authenticated based on determining that the respective digital profiles of the two or more passengers are included in manifest information for the commercial passenger vehicle.

21. The method of claim 19, wherein generating the digital record includes receiving the parameters from the two or more passengers via the mobile platform, the parameters including an attribution percentage for each of the two or more passengers and an exchange value for the digital record.

22. The method of claim 19, further comprising:
  identifying a subset of passengers of the commercial passenger vehicle having respective digital profiles configured to permit digital recording of real-world interactions; and
  prompting the real-world interaction to each of the two or more passengers based on the two or more passengers being included in the subset of passengers.

* * * * *